United States Patent
Song et al.

(10) Patent No.: US 9,649,943 B2
(45) Date of Patent: *May 16, 2017

(54) RECHARGING SYSTEM OF HYBRID VEHICLE USING NEUTRAL POINTS OF TWO MOTORS

(71) Applicant: Hyundai Motor Company, Seoul (KR)

(72) Inventors: Hong-seok Song, Gyeonggi-do (KR);
Ki-young Jang, Gyeonggi-do (KR);
Junghong Joo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 100 days.

This patent is subject to a terminal disclaimer.

(21) Appl. No.: 14/539,677

(22) Filed: Nov. 12, 2014

(65) Prior Publication Data

US 2015/0197156 A1 Jul. 16, 2015

Related U.S. Application Data

(62) Division of application No. 12/958,018, filed on Dec. 1, 2010, now Pat. No. 8,901,882.

(30) Foreign Application Priority Data

Jul. 9, 2010 (KR) ........................ 10-2010-0066377

(51) Int. Cl.
*B60L 11/18* (2006.01)
*H02J 7/00* (2006.01)

(52) U.S. Cl.
CPC ....... *B60L 11/1809* (2013.01); *B60L 11/1814* (2013.01); *B60L 11/1816* (2013.01); *B60L 11/1824* (2013.01); *B60L 11/1838* (2013.01); *B60L 2220/42* (2013.01); *H02J 7/00* (2013.01); *H02P 2209/01* (2013.01); *Y02T 10/646* (2013.01); *Y02T 10/648* (2013.01); *Y02T 10/7005* (2013.01); *Y02T 10/7072* (2013.01); *Y02T 10/7088* (2013.01); *Y02T 90/127* (2013.01); *Y02T 90/14* (2013.01)

(58) Field of Classification Search
CPC .............. B60L 11/1809; B60L 11/1824; B60L 11/1838; B60L 11/1816; B60L 11/1814
USPC ......................................................... 320/109
See application file for complete search history.

(56) References Cited

U.S. PATENT DOCUMENTS 6,380,715 B1  4/2002  Kubo
7,932,633 B2  4/2011  King et al.
(Continued)

*Primary Examiner* — Richard Isla Rodas
*Assistant Examiner* — Manuel Hernandez
(74) *Attorney, Agent, or Firm* — Mintz Levin Cohn Ferris Glovsky and Popeo, P.C.; Peter F. Corless

(57) ABSTRACT

A system for recharging a hybrid vehicle is provided with two motors and supplies commercial electricity to neutral points of the motors when a connection of a recharging stand is detected, forms an electricity loop through the neutral points of the first motor and the second motor according to a phase of the commercial electricity, and carries out a recharging mode by detecting at least a voltage of a DC link capacitor in a voltage converter, a voltage of a smoothing capacitor, and a battery voltage. According to the system, a current control value or a voltage control value is selected according to the recharging mode in order to recharge a battery based on the current control value or the voltage control value.

5 Claims, 16 Drawing Sheets

(56) References Cited

U.S. PATENT DOCUMENTS

| | | | |
|---|---|---|---|
| 8,186,465 B2* | 5/2012 | Oyobe | B60K 6/26 180/65.275 |
| 8,222,866 B2 | 7/2012 | Sugimoto et al. | |
| 8,301,322 B2 | 10/2012 | Mitsutani | |
| 2010/0096926 A1 | 4/2010 | King et al. | |
| 2012/0019174 A1* | 1/2012 | Mahlein | B60L 11/1803 318/139 |
| 2013/0147431 A1* | 6/2013 | Lim | H02J 7/022 320/109 |

* cited by examiner

RECHARGING SYSTEM OF HYBRID VEHICLE USING NEUTRAL POINTS OF TWO MOTORS

CROSS-REFERENCE TO RELATED APPLICATION

This application is a Divisional Application of U.S. patent application Ser. No. 12/958,018 filed Dec. 1, 2010, which claims priority to and the benefit of Korean Patent Application No. 10-2010-0066377 filed in the Korean Intellectual Property Office on Jul. 9, 2010, the entire contents of which are incorporated herein by reference.

BACKGROUND OF THE INVENTION (a) Field of the Invention

The present invention relates to a hybrid vehicle provided with two motors. More particularly, the present invention relates to a recharging system of the hybrid vehicle that recharges a battery by using neutral points of the two motors.

(b) Description of the Related Art

In order to meet tightened exhaust gas regulations on vehicles and to enhance fuel consumption, hybrid vehicles have been developed.

A hybrid vehicle generates electricity through regenerative braking by which a motor rotates inversely in a case of deceleration and recharges a battery. In addition, hybrid vehicles can enhance fuel consumption and reduce exhaust gases through ISG (Idle Stop and Go) control where an engine is stopped when the vehicle stops, and the engine is restarted by using the motor when the vehicle begins to run.

In addition, a plug-in recharging method may be applied to hybrid vehicles. According to the plug-in recharging method, the battery is recharged by using exterior commercial electricity.

An on-board charger which rectifies the commercial electricity and recharges the battery more slowly may be provided so as to apply the plug-in recharging method.

However, use of an on-board charger is undesirable, at least because on-board chargers generally are expensive and heavy, thus increasing manufacturing costs and negatively impacting fuel efficiency of the hybrid vehicle. In addition, since the charger often must be mounted in a limited space, it can be difficult to manufacture the charger as a package.

Particularly, since the on-board charger may cost about ten times more than an inverter producing the same output, use of such a charger is undesirable.

In addition, a high-speed recharging device may be provided so as to recharge the battery in a short time. In this case, commercial electricity is connected to a high-speed recharging port.

Conventionally, a high-speed recharging device must communicate with a battery controller at a high speed in real time so as to prevent overcharge of the battery and protect the battery. For this purpose, the high-speed recharging device has an additional communication channel.

However, in the event that a communication channel of an exterior system is connected to controllers in the hybrid vehicle, it may be difficult to assure reliability of the controller.

The above information disclosed in this Background section is only for enhancement of understanding of the background of the invention and therefore it may contain information that does not form the prior art that is already known in this country to a person of ordinary skill in the art.

SUMMARY OF THE INVENTION

In one aspect, the present invention provides a recharging system of a hybrid vehicle in which it is possible to recharge a battery by using motors and inverters selectively connected to commercial electricity without an additional expensive charger.

A recharging system of hybrid vehicle according to first and second exemplary embodiments of the present invention preferably includes at least a battery in which DC voltage is stored or for outputting the DC voltage; first and second motors configured to function as an electric motor or a generator; first and second inverters for operating the first and second motors respectively; a voltage converter for raising or lowering the DC voltage of the battery such that the raised or lowered DC voltage is supplied to the first and second inverters, in order to raise or lower the DC voltage supplied from the first and second inverters such that the raised or lowered DC voltage is supplied to the battery, and provided with a DC link; first and second diodes each provided with an anode terminal connected to a negative terminal of the first and second inverters and a cathode terminal connected to a source of commercial electricity and connected in parallel to first and second neutral points of the first and second motors; and a recharging controller for carrying out a recharging mode by detecting at least one of a phase of the commercial electricity supplied to the first and second neutral points of the first and second motors, a voltage of a DC link capacitor connecting the voltage converter and the first and second inverters, a battery voltage, a voltage of a smoothing capacitor connected at both terminals of the battery, a battery current, and a current flowing from the voltage converter to the battery, and controlling the voltage converter through a PWM duty according to the recharging mode of the battery such that the voltage of the DC link capacitor is raised or lowered and is supplied to the battery.

The recharging controller may decide a current control value and may control a charging current of the battery to follow the current control value in a case that the recharging mode of the battery is a current control mode.

The recharging controller may decide a voltage control value required for maintaining the voltage of the smoothing capacitor to be constant and may control the voltage converter based on the voltage control value so as to recharge the battery in a case that the recharging mode of the battery is not the current control mode.

According to the second exemplary embodiment of the present invention, the recharging system may further include: a main relay selectively connecting the battery with the voltage converter; a recharging port selectively connecting the commercial electricity disposed at an exterior of the vehicle to the first and second diodes; and a connection detector for detecting a connection of the commercial electricity.

The recharging controller may perform an initial activation thereof and may switch on the main relay so as to pre-recharge the DC link by means of the battery voltage in a case that the connection detector detects the connection of the commercial electricity.

The recharging controller may control a recharge of the battery according to the recharging mode in a case that the pre-recharge of the DC link is completed.

The recharging controller may decide the current control value and controls the charging current of the battery to follow the current control value in a case that the recharging mode of the battery is the current control mode.

The recharging controller may decide a voltage control value required for maintaining the voltage of the smoothing capacitor to be constant and may control the voltage converter based on the voltage control value so as to recharge the battery in a case that the recharging mode of the battery is not the current control mode.

The recharging controller may discharge the voltage of the DC link capacitor to be lower than a reference voltage to the battery in a case that a disconnection of the commercial electricity is detected during recharge or after the recharge is completed.

A recharging system of a hybrid vehicle according to third and fourth exemplary embodiments of the present invention may include: a battery in which DC voltage is stored or outputting the DC voltage; first and second motors configured to function as an electric motor or a generator; first and second inverters for operating the first and second motors respectively; a voltage converter for raising or lowering the DC voltage of the battery such that the raised or lowered DC voltage is supplied to the first and second inverters, in order to raise or lower the DC voltage supplied from the first and second inverters such that the raised or lowered DC voltage is supplied to the battery, and provided with a DC link; first and second diodes each provided with an anode terminal connected to a negative terminal of the first and second inverters and a cathode terminal connected to a source of commercial electricity and connected in parallel to first and second neutral points of the first and second motors; a recharging controller for carrying out a recharging mode by detecting at least one of a phase of the commercial electricity supplied to the first and second neutral points of the first and second motors, a voltage of a DC link capacitor connecting the voltage converter and the first and second inverters, a battery voltage, a voltage of a smoothing capacitor connected at both terminals of the battery, a battery current, and a current flowing from the voltage converter to the battery, and controlling the voltage converter through a PWM duty according to the recharging mode of the battery such that the voltage of the DC link capacitor is raised or lowered and is supplied to the battery; a main relay selectively connecting the battery with the voltage converter; a recharging port selectively connecting the commercial electricity disposed at an exterior of the vehicle to the first and second diodes; a connection detector for detecting a connection of the commercial electricity; and an input terminal switch mounted between the recharging port and the first and second motors and selectively connecting the commercial electricity to the first and second neutral points of the first and second motors by a control of the recharging controller.

According to the third exemplary embodiment of the present invention, the input terminal switch may include: a first relay connected to the first diode and the first neutral point of the first motor; and a second relay connected to the second diode and the second neutral point of the second motor.

The recharging controller may perform an initial activation thereof, may switch on the main relay, and may switch off the input terminal switch so as to pre-recharge the DC link by means of the battery voltage in a case that the connection detector detects the connection of the commercial electricity.

The recharging controller may switch on the input terminal switch and may control a recharge of the battery according to the recharging mode in a case that the pre-recharge of the DC link is completed.

The recharging controller may decide the current control value and may control the charging current of the battery to follow the current control value in a case that the recharging mode of the battery is the current control mode.

The recharging controller may decide a voltage control value required for maintaining the voltage of the smoothing capacitor to be constant and may control the voltage converter based on the voltage control value so as to recharge the battery in a case that the recharging mode of the battery is not the current control mode.

According to the fourth exemplary embodiment of the present invention, the input terminal switch may include: a first relay connected to the first diode and the first neutral point of the first motor; a second relay connected to the second diode and the second neutral point of the second motor; and a third relay connected in parallel with the first relay and connected in series with a resistance.

The recharging controller may perform an initial activation thereof, may switch on the second and third relays of the input terminal switch so as to form a low current loop, and may pre-recharge the DC link by using an electricity of the low current loop in a case that the connection detector detects the connection of the commercial electricity.

The recharging controller may switch off the third relay, may switch on the first relay, and may switch on the main relay so as to recharge the battery by using the normal commercial electricity in a case that the pre-recharge of the DC link is completed.

The recharging controller may discharge the voltage of the DC link capacitor to be lower than a reference voltage to the battery in a case that a disconnection of the commercial electricity is detected during recharge or after the recharge is completed.

DESCRIPTION OF SYMBOLS

Figure 1:
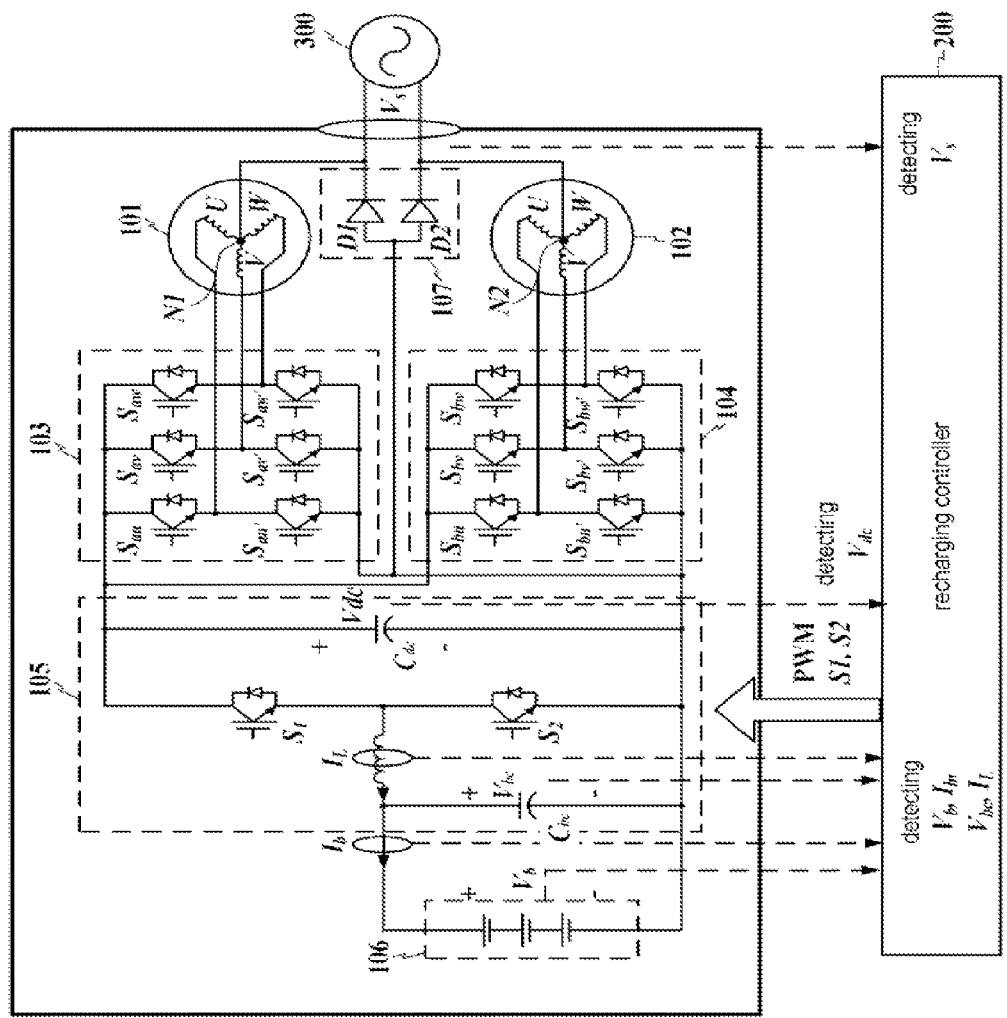
FIG. 1 is a circuit diagram of a recharging system of a hybrid vehicle according to a first exemplary embodiment of the present invention.

101: the first motor
102: the second motor
103: the first inverter
104: the second inverter
105: voltage converter
106: battery
107: diode
108: recharging port
109: connection detector
110: input terminal switch

DETAILED DESCRIPTION OF PREFERRED EMBODIMENTS

First Exemplary Embodiment

Hereinafter, a first exemplary embodiment of the present invention will be described in detail referring to the drawings.

As those skilled in the art would realize, the described embodiments may be modified in various different ways, all without departing from the spirit or scope of the present invention. Description of components that are not necessary for explaining the present invention will be omitted, and the same constituent elements are denoted by the same reference numerals in this specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is a circuit diagram of a recharging system of a hybrid vehicle according to the first exemplary embodiment of the present invention.

Referring to FIG. 1, the first exemplary embodiment of the present invention preferably includes at least a first motor 101, a second motor 102, a first inverter 103, a second inverter 104, a voltage converter 105, a battery 106, a diode 107 (for example, including first and second diodes D1 and D2), and a recharging controller 200.

The first motor 101 is a 3-phase AC electric motor, which can be operated as an electric motor to start an engine (not shown), and selectively operated as a generator driven by the engine.

The first motor 101 preferably is powered by 3-phase AC voltage supplied through the first inverter 103 so as to start the engine. In addition, the first motor 101 configured to be driven by the engine so as to generate 3-phase AC voltage and output the 3-phase AC voltage to the first inverter 103.

The second motor 102 is a 3-phase AC electric motor capable of driving a driving wheel (not shown) and generating driving torque by 3-phase AC voltage supplied from the second inverter 104.

In addition, the second motor 102 can be operated as a generator in a case of regenerative braking of the vehicle so as to generate 3-phase AC voltage and output the 3-phase AC voltage to the second inverter 104.

The first motor 101 can include a Y-type wiring 3-phase coil as a stator coil. Also, U, V, and W phase coils forming the 3-phase coil each are respectively provided with one end interconnected so as to form a first neutral point N1 and the other end connected to a corresponding arm of the first inverter 103.

The first neutral point N1 of the first motor 101 is connected to commercial electricity 300 that preferably is input from the exterior.

The second motor 102 includes a Y-type wiring 3-phase coil as a stator coil. Also, U, V, and W phase coils forming the 3-phase coil each are respectively provided with one end interconnected so as to form a second neutral point N2 and the other end connected to a corresponding arm of the second inverter 104.

The second neutral point N2 of the second motor 102 is connected to commercial electricity 300 that preferably is input from the exterior.

The first inverter 103 converts the DC voltage of the battery 106 supplied through the voltage converter 105 into 3-phase AC voltage according to a PWM signal applied from the recharging controller 200 and supplies the 3-phase AC voltage to the first motor 101 as a driving voltage.

The first inverter 103 is connected to a DC link (a portion to which Vdc is applied) of the voltage converter 105 and the second diode D2 of the diode 107 so as to form a circulation path when the commercial electricity 300 supplied to the first inverter 103 through the first neutral point N1 of the first motor 101 has a positive value (Vs>0).

The second inverter 104 converts the DC voltage of the battery 106 supplied through the voltage converter 105 into 3-phase AC voltage according to a PWM signal applied from the recharging controller 200 and supplies the 3-phase AC voltage to the second motor 102 as a driving voltage.

The second inverter 104 is connected to the DC link of the voltage converter 105 and the first diode D1 of the diode 107 so as to form a circulation path when the commercial electricity 300 supplied to the second inverter 104 through the second neutral point N2 of the second motor 102 has a negative value (Vs<0).

The first inverter 103 is formed by connecting electric switching elements in series, and includes U phase arms Sau and Sau', V phase arms Sav and Sav', and W phase arms Saw and Saw'.

One of an NPN transistor, an IGBT (Insulated Gate Bipolar Transistor), and an MOSFET may be used as the electric switching element.

The second inverter 104 is formed by connecting electric switching elements in series, and includes U phase arms Sbu and Sbu', V phase arms Sbv and Sbv', and W phase arms Sbw and Sbw'.

One of an NPN transistor, an IGBT (Insulated Gate Bipolar Transistor), and an MOSFET may be used as the electric switching element.

The voltage converter 105 is a DC/DC converter, and thus raises or lowers the DC voltage supplied from the battery 106 to a voltage of predetermined level according to a PWM duty control signal applied from the recharging controller 200, and outputs it to the first inverter 103 or the second inverter 104.

In addition, the voltage converter 105 raises or lowers the DC voltage applied from the first inverter 103 or the second inverter 104 according to a PWM duty control signal applied from the recharging controller 200 and outputs it to the battery 106 as a recharging voltage.

The voltage converter 105 preferably is connected to both ends of the battery 106, and includes first and second electric switching elements S1 and S2 connected in series with a DC link capacitor Cdc and a smoothing capacitor Cbc smoothing a voltage change between both ends of the battery 106.

In a case that the exterior commercial electricity 300 supplied to the first neutral point N1 of the first motor 101 and the second neutral point N2 of the second motor 102 is supplied to the DC link forming the circulation path through the first inverter 103 and the second inverter 104, the voltage converter 105 switches on or off the first electric switching element S1 and the second electric switching element S2 according to a control signal applied from the recharging controller 200 and recharges the battery 106.

The battery 106 preferably utilizes DC electricity. For example, one of nickel-hydrogen and lithium-ion rechargeable battery and a capacitor of large capacity may be used as the battery 106. Preferably, the DC voltage recharged in the voltage converter 105 is raised or lowered so as to be supplied to the first motor 101 or the second motor 102.

In addition, the battery 106 can be recharged by exterior commercial electricity 300, which is raised or lowered by the voltage converter 105 and applied to the battery 106.

The diode 107 includes the first diode D1 and the second diode D2. One terminal, e.g., an anode terminal of the diode 107 is connected to a negative terminal of the first and second inverters 103 and 104, and a cathode terminal is connected to the exterior commercial electricity 300 and the first and second neutral points N1 and N2 of the first and second motors 101 and 102.

The commercial electricity 300 can be connected to the system through a plug connection or a connector connection.

The commercial electricity 300 may be AC electricity or DC electricity.

The recharging controller 200 detects a phase Vs of the commercial electricity 300 supplied to the first neutral point N1 of the first motor 101 and the second neutral point N2 of the second motor 102, a voltage Vdc of a DC link capacitor Cdc forming a circulation loop, a battery voltage Vb, a voltage Vbc of the smoothing capacitor Cbc connected to both ends of the battery 106, an inductor current $I_L$, and a charging current Ib and determines a recharging mode.

In addition, the recharging controller 200 decides a recharging control value according to the recharging mode, and recharges the battery 106 by switching on or off the first electric switching element S1 and the second electric switching element S2 of the voltage converter 105 through the PWM duty control.

One of ordinary skill in the art would understand that driving the first motor by the battery voltage and starting the engine, recharging the battery by the voltage generated by the driving torque of the engine, driving the second motor by the battery voltage and running the vehicle, and recharging the battery through the regenerative braking as performed in conjunction with the first exemplary embodiment of the present invention are the same as those according to conventional arts, and detailed descriptions thereof will be omitted.

The first exemplary embodiment of the present invention relates to recharging the battery 106 by supplying the exterior commercial electricity to the first neutral point N1 of the first motor 101 and the second neutral point N2 of the second motor 102 without the need for additional recharging devices, which will be described in further detail herein.

Figure 2:
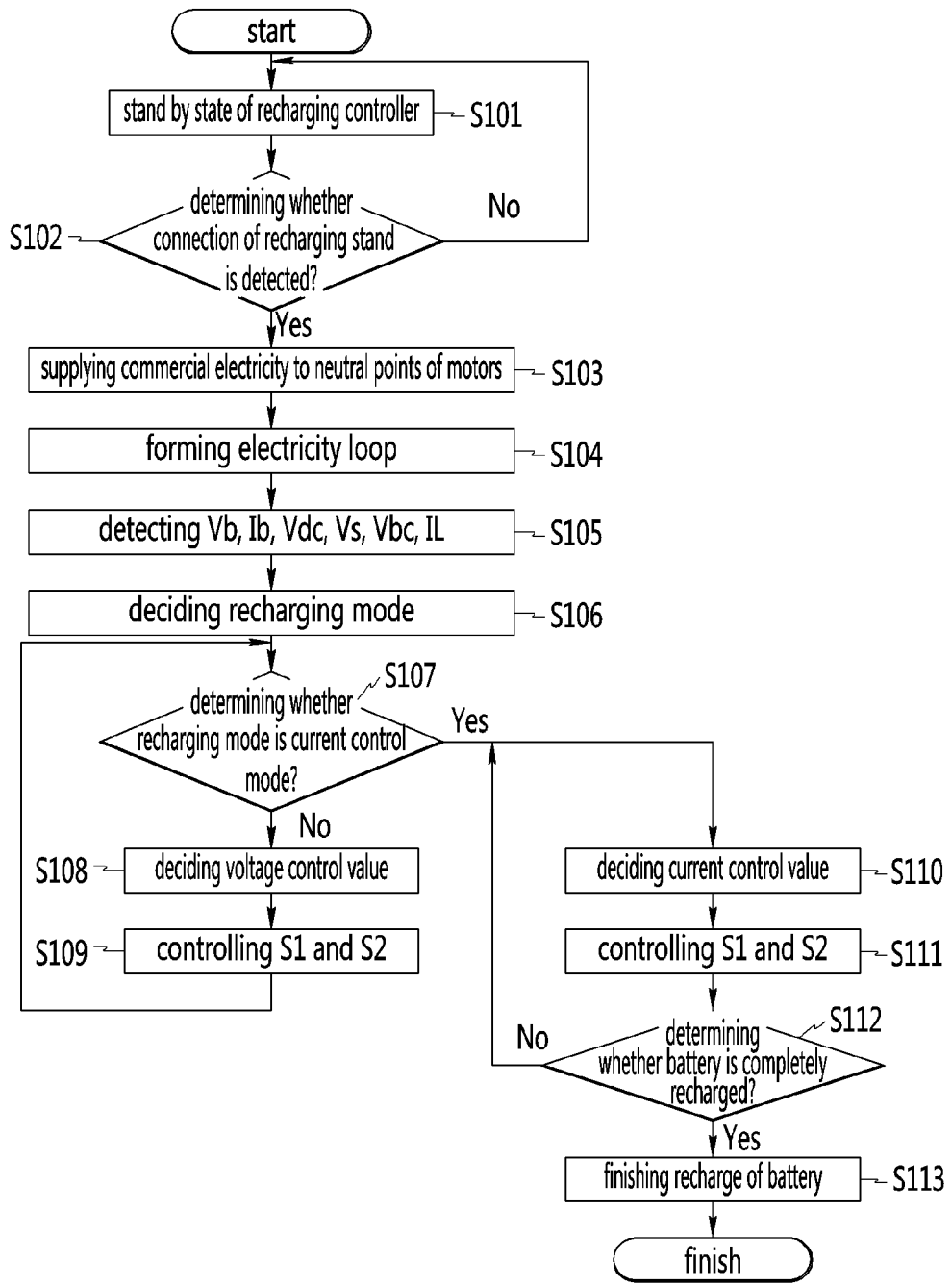
FIG. 2 is a flowchart showing a method for recharging a battery by using the recharging system of FIG. 1.

FIG. 2 is a flowchart showing a method for recharging a battery by using a recharging system according to the first exemplary embodiment of the present invention.

Referring to FIG. 2, in a state that the recharging controller 200 of the hybrid vehicle according to the first exemplary embodiment of the present invention stands by at step S101, it is determined whether the commercial electricity 300 is connected through the plug connection or the connector connection at step S102.

If the commercial electricity 300 is connected for recharging the battery 106, the commercial electricity 300 is supplied to the first neutral point N1 of the first motor 101 and the second neutral point N2 of the second motor 102 at step S103.

Figure 3:
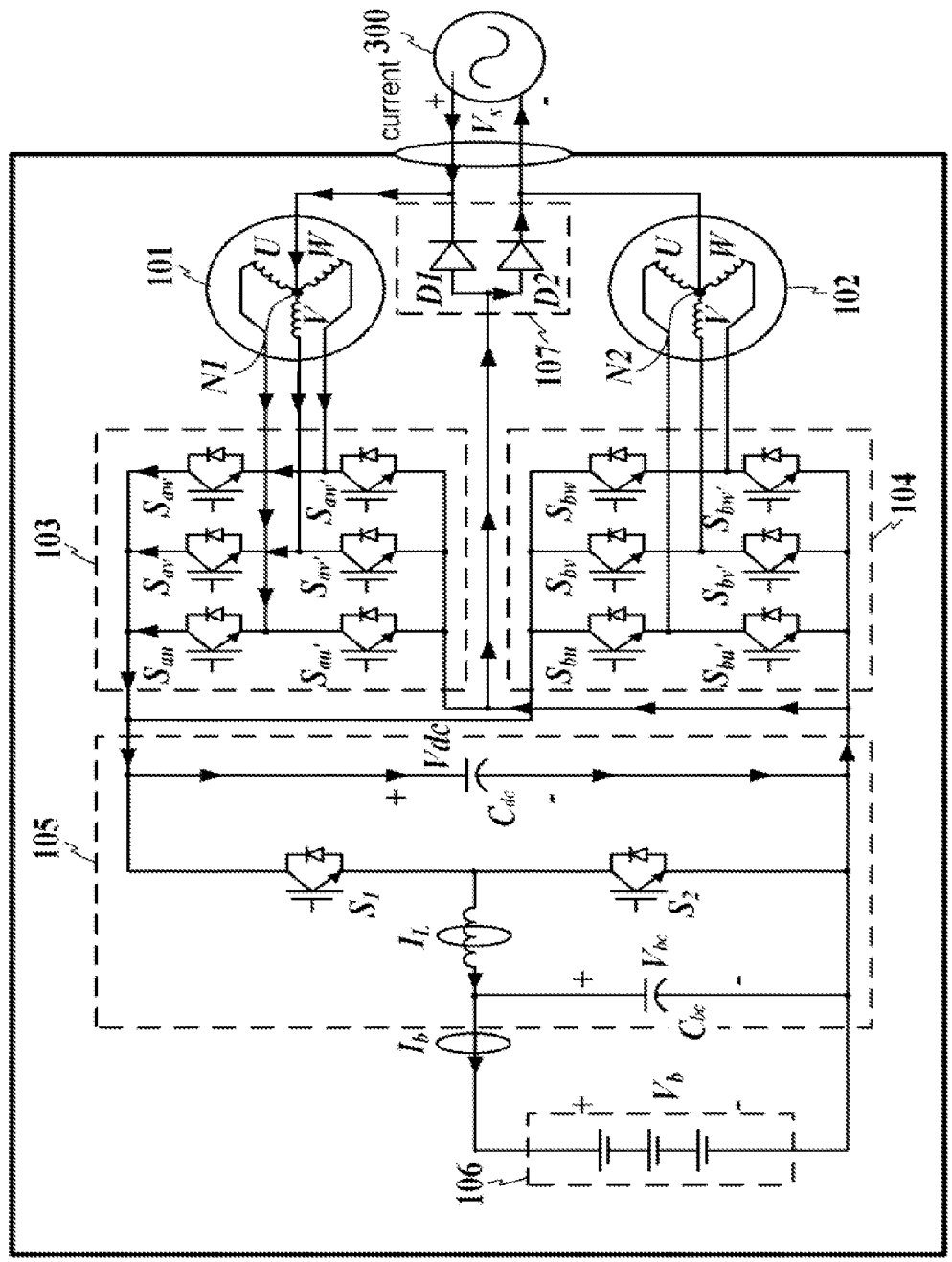
FIGS. 3 and 4 are circuit diagrams showing current flow according to a phase of commercial electricity in a recharging system according to the first exemplary embodiment of the present invention.
Figure 4:
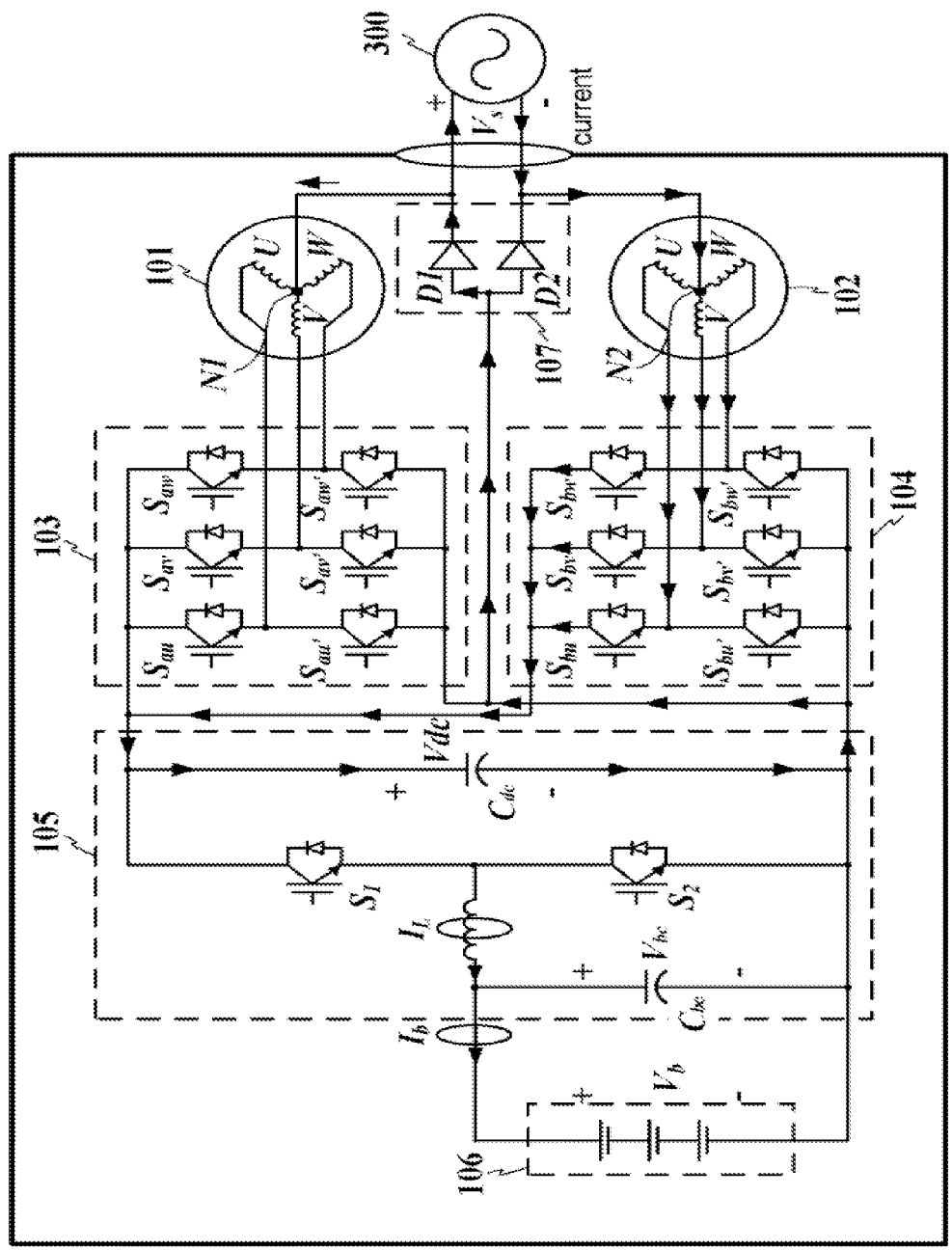

At step S104, an electricity loop shown in FIG. 3 is formed if the phase of the commercial electricity 300 is positive value (Vs>0), and the electricity loop shown in FIG. 4 is formed if the phase of the commercial electricity 300 is a negative value (Vs<0). Therefore, the DC link capacitor Cdc included in the voltage converter 105 is recharged.

Referring to FIG. 3, the electricity loop in a state that the phase of the commercial electricity 300 is a positive value (Vs>0) is formed as follows.

The voltage of the commercial electricity 300 is supplied to the first neutral point N1 of the first motor 101, and an upper U phase arm Sau, an upper V phase arm Sav, and an upper W phase arm Saw of the electric switching element constituting the first inverter 103 is electrified. At this time, each upper arm may be electrified through a bypass diode connected in parallel therewith.

Therefore, a current of the commercial electricity 300 flows to the DC link capacitor Cdc in the voltage converter 105 through the upper U phase arm Sau, the upper V phase arm Sav, and the upper W phase arm Saw of the first inverter 103, and is returned to the commercial electricity 300 through the second diode D2 of the diode 107 connected to the negative terminal of the first and second inverters 103 and 104.

Referring to FIG. 4, the electricity loop in a state that the phase of the commercial electricity 300 is negative value (Vs<0) is formed as follows.

The voltage of the commercial electricity 300 is supplied to the second neutral point N2 of the second motor 102, and an upper U phase arm Sbu, an upper V phase arm Sbv, and an upper W phase arm Sbw of the electric switching element constituting the second inverter 104 is electrified. At this time, each upper arm may be electrified through a bypass diode connected in parallel therewith.

Therefore, the current of the commercial electricity 300 flows to the DC link capacitor Cdc in the voltage converter 105 through the upper U phase arm Sbu, the upper V phase arm Sbv, and the upper W phase arm Sbw of the second inverter 104, and is returned to the commercial electricity 300 through the first diode D1 of the diode 107 connected to the negative terminal of the first and second inverters 103 and 104.

Therefore, the DC link capacitor Cdc in the voltage converter 105 is recharged. At this time, the recharging controller 200 detects the phase Vs of the commercial electricity supplied to the first neutral point N1 of the first motor 101 and the second neutral point N2 of the second motor 102, the voltage Vdc of the DC link capacitor Cdc which is recharged, the battery voltage Vb, the voltage Vbc of the smoothing capacitor Cbc connected to both ends of the battery 106, the inductor current $I_L$, and the charging current Ib at step S105, and determines the recharging mode based thereon at step S106.

Particularly, the recharging controller 200 determines whether the recharging mode is a current control mode where the battery voltage is maintained to be higher than or equal to a predetermined reference voltage (e.g., 80% of a maximum voltage) at step S107.

If the recharging mode is not the current control mode at the step S107, the recharging controller 200 decides a voltage control value which can maintain the voltage Vbc of the smoothing capacitor Cbc connected to both ends of the battery 106 to be constant at step S108.

Subsequently, the recharging controller 200 controls operations of the first electric switching element S1 and the second electric switching element S2 in the voltage converter 105 based on the voltage control value decided at the step S108 and recharges the battery 106 at step S109. Meanwhile, if the recharging mode is the current control mode at the step S107, the recharging controller 200 decides a current control value considering a detecting error at step S110.

Thereafter, the recharging controller 200 controls the operations of the first electric switching element S1 and the second electric switching element S2 in the voltage converter 105 based on the decided current control value, and controls a charging current of the battery 106 to follow the current control value at step S111.

The recharging controller 200 determines whether the battery 106 is completely recharged at step S112. If the battery 106 is not completely recharged at step S112, the recharging controller 200 returns to step S110 and repeats steps S110 to S112. If the battery 106 is completely recharged at step S112, the recharge of the battery 106 is finished at step S113 in order for the battery 106 to be overcharged.

As described above. the exterior commercial electricity is supplied to the first neutral point of the first motor and the second neutral point of the second motor so as to recharge the DC link capacitor, and the battery is stably recharged through a PWM control of the electric switching element of the voltage converter according to the first exemplary embodiment of the present invention. Since an expensive recharging device is not used, it is possible to reduce manufacturing costs while enhancing fuel economy.

Second Exemplary Embodiment

Hereinafter, a second exemplary embodiment of the present invention will be described in detail referring to the drawings.

Figure 5:
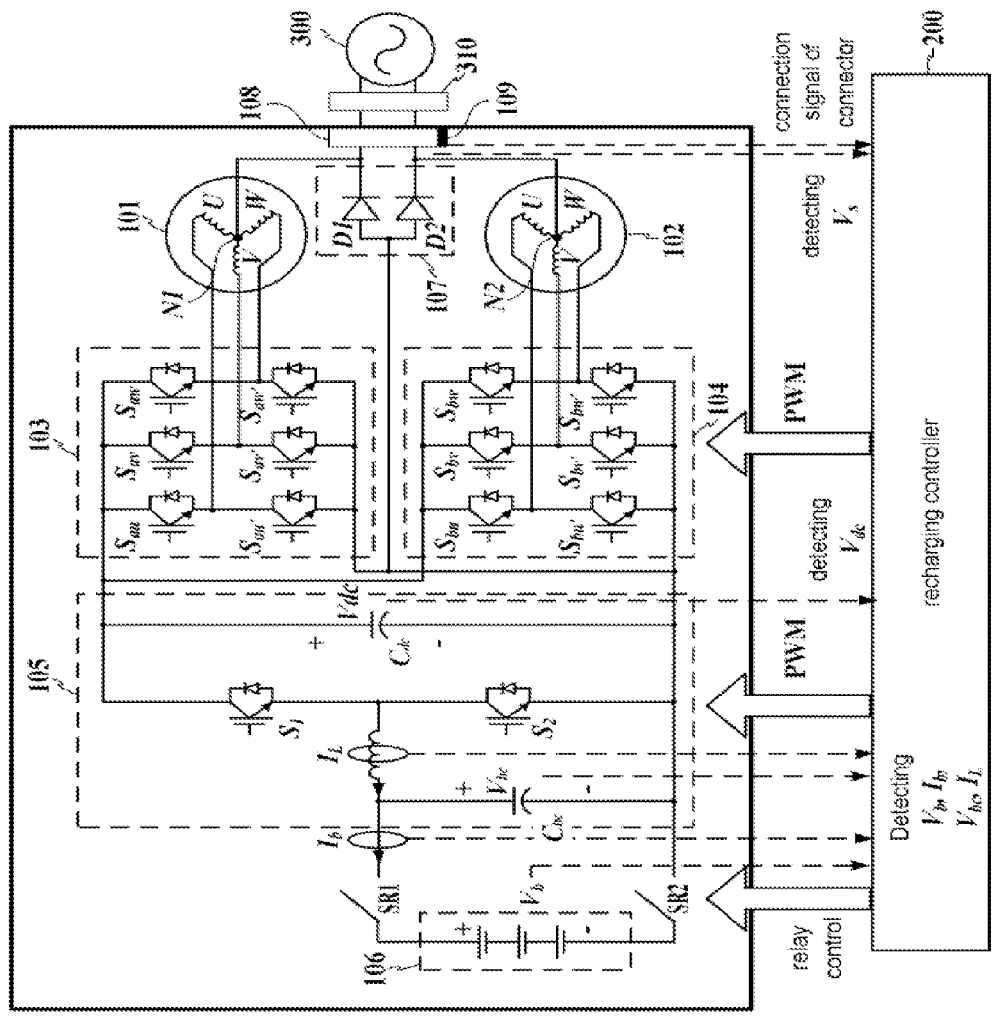
FIG. 5 is a circuit diagram of a recharging system of a hybrid vehicle according to a second exemplary embodiment of the present invention.

FIG. 5 is a circuit diagram of a recharging system of a hybrid vehicle according to the second exemplary embodiment of the present invention.

Referring to FIG. 5, the second exemplary embodiment of the present invention preferably includes at least a first motor 101, a second motor 102, a first inverter 103, a second inverter 104, a voltage converter 105, a battery 106, a diode 107 (for example, including first and second diodes D1 and D2), a recharging port 108, a connection detector 109, a main relay SR1 and SR2, and a recharging controller 200.

The first motor 101 is a 3-phase AC electric motor, which can be operated as an electric motor to start an engine (not shown), and selectively operated as a generator driven by the engine.

The first motor 101 preferably is powered by 3-phase AC voltage supplied through the first inverter 103 so as to start the engine. In addition, the first motor 101 can be driven by the engine so as to generate 3-phase AC voltage and output the 3-phase AC voltage to the first inverter 103.

The second motor 102 preferably is a 3-phase AC electric motor for driving a driving wheel (not shown) and generating driving torque by 3-phase AC voltage supplied from the second inverter 104.

In addition, the second motor 102 can be operated as a generator in a case of regenerative braking of the vehicle so as to generate 3-phase AC voltage and output the 3-phase AC voltage to the second inverter 104.

The first motor 101 includes a Y-type wiring 3-phase coil as a stator coil. Also, U, V, and W phase coils forming the 3-phase coil each are respectively provided with one end interconnected so as to form a first neutral point N1 and the other end connected to a corresponding arm of the first inverter 103.

The first neutral point N1 of the first motor 101 is connected to commercial electricity 300 that preferably is input from the exterior.

The second motor 102 includes a Y-type wiring 3-phase coil as a stator coil. Also, U, V, and W phase coils forming the 3-phase coil each are respectively provided with one end interconnected so as to form a second neutral point N2 and the other end connected to a corresponding arm of the second inverter 104.

The second neutral point N2 of the second motor 102 is connected to commercial electricity 300 that preferably is input from the exterior.

The first inverter 103 converts the DC voltage of the battery 106 supplied through the voltage converter 105 into the 3-phase AC voltage according to a PWM signal applied from the recharging controller 200 and supplies the 3-phase AC voltage to the first motor 101 as a driving voltage.

The first inverter 103 is connected to a DC link (a portion to which Vdc is applied) of the voltage converter 105 and the second diode D2 of the diode 107 so as to form a circulation path when the commercial electricity 300 supplied to the first inverter 103 through the first neutral point N1 of the first motor 101 has a positive value (Vs>0).

The second inverter 104 converts the DC voltage of the battery 106 supplied through the voltage converter 105 into 3-phase AC voltage according to a PWM signal applied from the recharging controller 200 and supplies the 3-phase AC voltage to the second motor 102 as a driving voltage.

The second inverter 104 is connected to the DC link of the voltage converter 105 and the first diode D1 of the diode 107 so as to form a circulation path when the commercial electricity 300 supplied to the second inverter 104 through the second neutral point N2 of the second motor 102 has a negative value (Vs<0).

The first inverter 103 is formed by connecting electric switching elements in series, and includes U phase arms Sau and Sau', V phase arms Say and Say', and W phase arms Saw and Saw'. One of an NPN transistor, an IGBT (Insulated Gate Bipolar Transistor), and an MOSFET may be used as the electric switching element.

The second inverter 104 is formed by connecting electric switching elements in series, and includes U phase arms Sbu and Sbu', V phase arms Sbv and Sbv', and W phase arms Sbw and Sbw'.

One of an NPN transistor, an IGBT (Insulated Gate Bipolar Transistor), and an MOSFET may be used as the electric switching element.

The voltage converter 105 preferably is a DC/DC converter, and thus raises or lowers the DC voltage supplied from the battery 106 to a voltage of a predetermined level according to a PWM duty control signal applied from the recharging controller 200, and outputs it to the first inverter 103 or the second inverter 104.

In addition, the voltage converter 105 preferably raises or lowers the DC voltage applied from the first inverter 103 or the second inverter 104 according to a PWM duty control signal applied from the recharging controller 200 and outputs it to the battery 106 as a recharging voltage.

The voltage converter 105 preferably is connected to both ends of the battery 106, and includes first and second electric switching elements S1 and S2 connected in series with a DC link capacitor Cdc and a smoothing capacitor Cbc smoothing a voltage change between both ends of the battery 106.

In a case that the exterior commercial electricity 300 supplied to the first neutral point N1 of the first motor 101 and the second neutral point N2 of the second motor 102 is supplied to the DC link forming the circulation path through the first inverter 103 and the second inverter 104, the voltage converter 105 switches on or off the first electric switching element S1 and the second electric switching element S2 according to a control signal applied from the recharging controller 200 and recharges the battery 106.

The battery 106 preferably utilizes DC electricity. For example, one of nickel-hydrogen and lithium-ion rechargeable battery and a capacitor of large capacity may be used as the battery 106. The DC voltage recharged in the voltage converter 105 is raised or lowered so as to be supplied to the first motor 101 or the second motor 102.

In addition, the battery 106 is recharged by the exterior commercial electricity 300 which is raised or lowered by the voltage converter 105 and is applied to the battery 106.

The diode 107 includes the first diode D1 and the second diode D2. One terminal, e.g., an anode terminal of the diode 107 is connected to a negative terminal of the first and second inverters 103 and 104, and a cathode terminal is connected to the exterior commercial electricity 300 and the first and second neutral points N1 and N2 of the first and second motors 101 and 102.

The recharging port 108 is connected to a recharging port 310 of the exterior commercial electricity 300, and receives electricity for recharging the battery 106.

The connection detector 109 detects a connection of a connector for connecting the commercial electricity 300 to the recharging port 108 and transmits information corresponding thereto to the recharging controller 200. The connection detector 109 may be a cover open detector which detects that a cover of the recharging port is open.

In addition, the connection of the commercial electricity 300 to the recharging port 108 may be detected by communication between the recharging port 108 and a recharging stand for supplying the commercial electricity.

The communication between the recharging port 108 and the recharging stand can be done by various means, for example, wire communication and wireless communication including common interfaces such as CAN communication or Bluetooth communication.

The connection detector 109 transmits aim of recharging the battery 106 to the recharging controller 200 before the commercial electricity 300 is electrically connected to the first neutral point N1 of the first motor 101 and the second neutral point N2 of the second motor 102.

The main relay SR1 and SR2 is connected to both ends of the battery 106 and controls voltage and current input to or output from the battery 106. The commercial electricity 300 is selectively connected to the system through the recharging port 310.

The commercial electricity 300 may be AC electricity or DC electricity.

In a case that the connection signal of the connector or open of the cover of the recharging port is detected, the recharging controller 200 recognizes this as the aim for recharging the battery 106. In this case, the recharging controller 200 performs the initial activation so as to stabilize the system before the exterior commercial electricity 300 is supplied.

If the initial activation of the recharging controller 200 is performed, the recharging controller 200 switches on the main relay SR1 and SR2 and pre-recharges the DC link capacitor Cdc to a voltage of predetermined level with the battery 106. Subsequently, the recharging controller 200 supplies the exterior commercial electricity 300 to the system. Therefore, it is possible to prevent occurrence of an inrush current when the commercial electricity 300 is supplied, thus protecting electric switching elements used in conjunction with the second exemplary embodiment of the present invention.

If the exterior commercial electricity 300 is not supplied to the first neutral point N1 of the first motor 101 and the second neutral point N2 of the second motor 102 after the recharge of the battery 106 is completed or the connector (for example, a recharging stand) is disconnected during recharging, the recharging controller 200 controls the first electric switching element S1 and the second electric switching element S2 in the voltage converter 105 so as to supply a remaining voltage remaining in the DC link capacitor Cdc to the battery 106 and to maintain the battery 106 to be a maximum recharge state. After the DC link capacitor Cdc is discharged to a voltage lower than a reference voltage, the recharging controller 200 switches off the main relay SR1 and SR2 so as to stabilize the system.

In a state that the initial activation and the pre-recharge of the DC link capacitor are performed, the recharging controller 200 detects the phase Vs of the commercial electricity 300 supplied to the first neutral point N1 of the first motor 101 and the second neutral point N2 of the second motor 102, the voltage Vdc of the DC link capacitor Cdc forming a circulation loop, a battery voltage Vb, a voltage Vbc of the smoothing capacitor Cbc connected to both ends of the battery 106, an inductor current $I_L$, and a charging current Ib and determines a recharging mode.

In addition, the recharging controller 200 decides a recharging control value according to the recharging mode, and recharges the battery 106 by switching on or off the first electric switching element S1 and the second electric switching element S2 of the voltage converter 105 through the PWM duty control.

One of ordinary skill in the art would understand that driving the first motor by the battery voltage and starting the engine, recharging the battery by the voltage generated by the driving torque of the engine, driving the second motor by the battery voltage and running the vehicle, and recharging the battery through the regenerative braking as performed in conjunction with the second exemplary embodiment of the present invention are the same as those according to conventional arts, and detailed descriptions thereof will be omitted.

According to the second exemplary embodiment of the present invention, if connection of commercial electricity to the recharging port is detected, the recharging controller recognizes that the commercial electricity should be used for recharging the battery, performs the initial activation, and pre-recharges the DC link capacitor. In addition, the second exemplary embodiment of the present invention relates to recharge of the battery 106 by supplying the exterior commercial electricity to the first neutral point N1 of the first motor 101 and the second neutral point N2 of the second motor 102 without the need for additional recharging devices, as described in further detail herein.

Figure 6A:
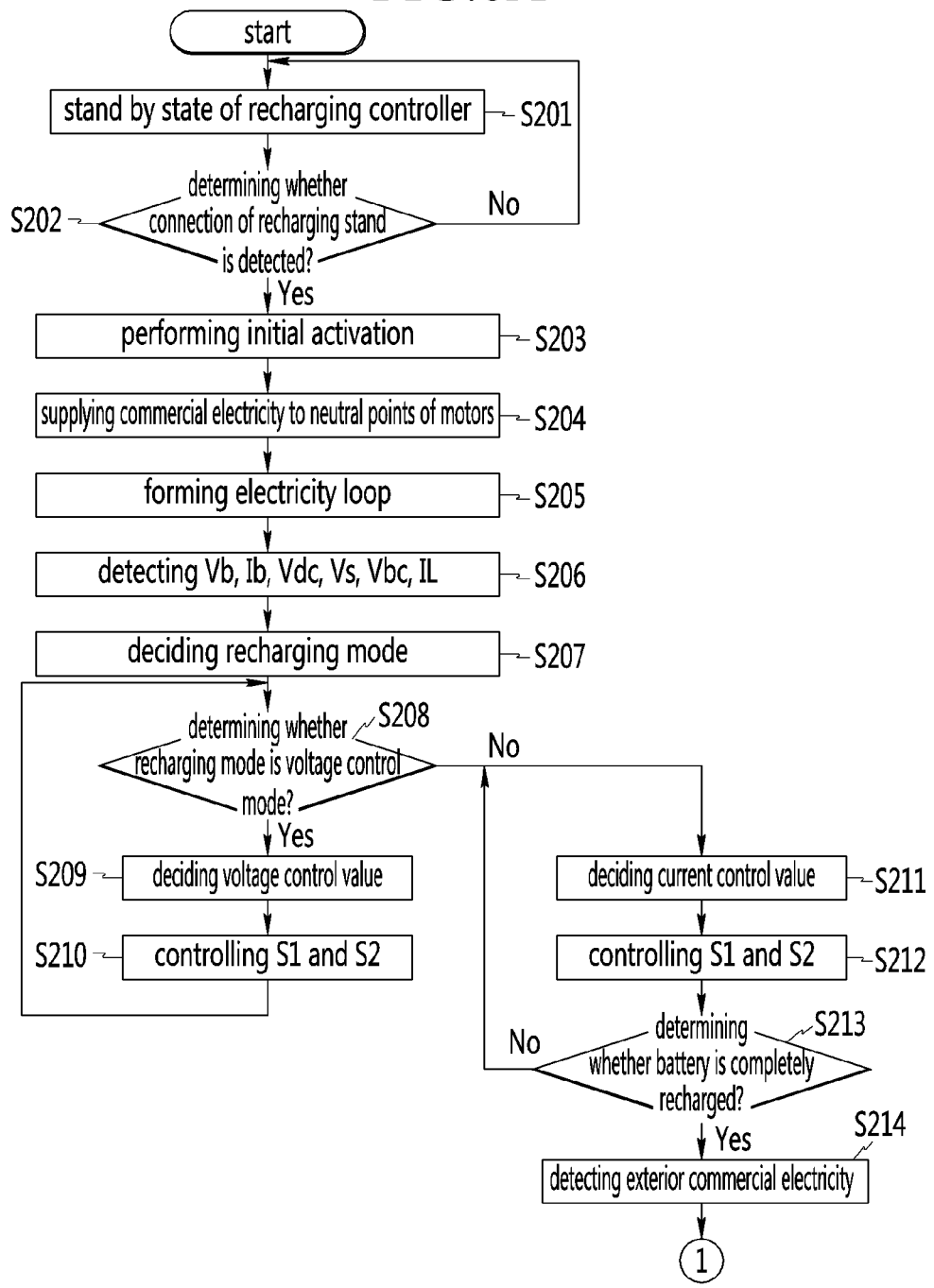
FIGS. 6A and 6B are flowcharts of a method for recharging a battery by using the recharging system of FIG. 5.
Figure 6B:
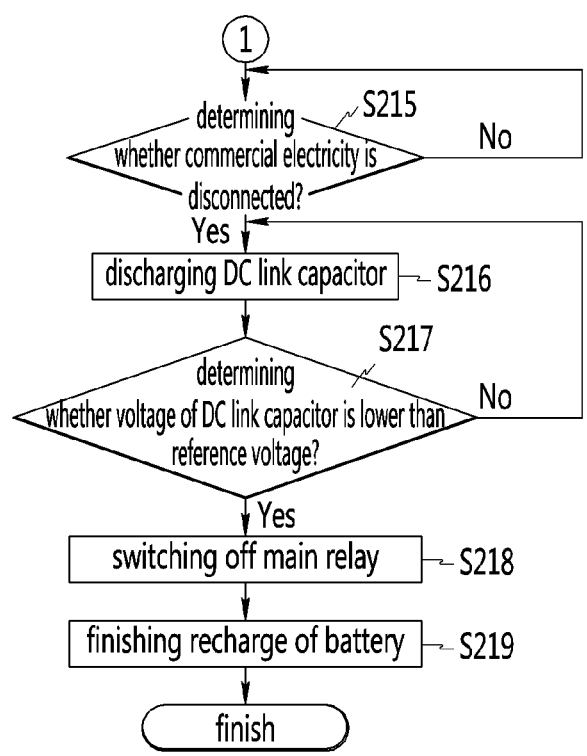

FIG. 6 is a flowchart of a method for recharging a battery by using a recharging system according to the second exemplary embodiment of the present invention.

Referring to FIG. 6, in a state that the recharging controller 200 of the hybrid vehicle according to the second exemplary embodiment of the present invention stands by at step S201, the recharging controller 200 determines from the connection detector 109 whether the exterior commercial electricity 300 is connected at step S202.

The connection of the exterior commercial electricity 300 may be detected by the cover of the recharging port being open, a connection signal of the connector, or communication with the recharging stand.

If the connection of the exterior commercial electricity 300 is detected at the step S202, the recharging controller 200 performs initial activation thereof at step S203.

For reference, the recharging controller 200 of digital device needs an initial activation time (for example, on the order of about tens of μs to hundreds of ms) so as to operate normally after electricity is supplied. In addition, if the recharging controller 200 is not activated, the recharging controller 200 will not output a normal control signal.

If high voltage is supplied to the first inverter 103, the second inverter 104, and voltage converter 105 through the first neutral point N1 of the first motor 101 and the second neutral point N2 of the second motor N2, a control electricity cannot be normally applied to a driving portion of the electric switching element, e.g., a gate drive. Therefore, the electric switching elements may operate abnormally by noise, overcurrent may be supplied, or components may be damaged.

If the exterior commercial electricity 300 is connected through the connection of the recharging stand or the connector to the recharging port 108 in a state that the initial activation of the recharging controller 200 is performed, the commercial electricity 300 is supplied to the first neutral point N1 of the first motor 101 and the second neutral point N2 of the second motor 102 at step S204.

At step S205, an electricity loop shown in FIG. 3 is formed if the phase of the commercial electricity 300 is a positive value (Vs>0), and the electricity loop shown in FIG. 4 is formed if the phase of the commercial electricity 300 is a negative value (Vs<0). Therefore, the DC link capacitor Cdc included in the voltage converter 105 is recharged.

The electricity loop formed according to the phase Vs of the commercial electricity 300 is the same as that of the first exemplary embodiment of the present invention, and thus a detailed description thereof will be omitted.

At this time, the recharging controller 200 detects the phase Vs of the commercial electricity supplied to the first neutral point N1 of the first motor 101 and the second neutral point N2 of the second motor 102, the voltage Vdc of the DC link capacitor Cdc which is recharged, the battery voltage Vb, the voltage Vbc of the smoothing capacitor Cbc connected to both ends of the battery 106, the inductor current $I_L$, and the charging current Ib at step S206, and determines the recharging mode based thereon at step S207.

Particularly, the recharging controller 200 determines whether the recharging mode is a voltage control mode where the battery voltage is maintained to be lower than a predetermined reference voltage (e.g., 80% of a maximum voltage) at step S208.

If the recharging mode is the voltage control mode at the step S208, the recharging controller 200 decides a voltage control value which can maintain the voltage Vbc of the smoothing capacitor Cbc connected to both ends of the battery 106 to be constant at step S209.

Subsequently, the recharging controller 200 controls operations of the first electric switching element S1 and the second electric switching element S2 in the voltage converter 105 based on the voltage control value decided at the step S209 and performs a high-speed recharge of the battery 106 at step S210. If the recharging mode is not the voltage control mode at the step S208, the recharging controller 200 determined that the recharging mode is a current control mode and decides a current control value considering a detecting error at step S211.

Thereafter, the recharging controller 200 controls the operations of the first electric switching element S1 and the second electric switching element S2 in the voltage converter 105 based on the decided current control value, and controls a charging current of the battery 106 to follow the current control value at step S212.

The recharging controller 200 determines whether the battery 106 is completely recharged at step S213. If the battery 106 is not completely recharged at the step S213, the recharging controller 200 returns to the step S211 and repeats the steps S211 to S213. If the battery 106 is completely recharged at the step S213, the recharge of the battery 106 is finished at step S113 in order for the battery 106 to be overcharged.

Subsequently, the recharging controller 200 detects the connection of the exterior commercial electricity 300 at step S214, and determines whether the exterior commercial electricity 300 is disconnected by the disconnection of the connector (recharging stand) from the system at step S215.

If the exterior commercial electricity 300 is disconnected at the step S215, the recharging controller 200 controls the first electric switching element S1 and the second electric switching element S2 in the voltage converter 105 so as to supply the remaining voltage remaining in the DC link capacitor Cdc to the battery 106 and to maintain the battery 106 to be a maximum recharge state. That is, the DC link capacitor Cdc is discharged to a voltage lower than the reference voltage at step S216.

Subsequently, the recharging controller 200 detects the voltage Vdc of the DC link capacitor Cdc and determines whether the voltage Vdc is lower than the reference voltage at step S217. If the voltage Vdc of the DC link capacitor Cdc is greater than or equal to the reference voltage at the step S217, the recharging controller 200 returns to the step S216. If the voltage Vdc of the DC link capacitor Cdc is lower than the reference voltage at the step S217, the recharging controller 200 switches off the main battery SR1 and SR2 mounted between both ends of the battery 106 and controlling input or output voltage of the battery 106 so as to stabilize the system at step S218. After that, the recharging controller completes the recharge of the battery 106 at step S219.

It is described in this specification that the second exemplary embodiment of the present invention is applied to a case in which the disconnection of the connector (for example, a recharging stand) is detected after the recharge is completed. However, the second exemplary embodiment of the present invention also can be applied to a case in which the disconnection of the connector (recharging stand) connected to the exterior commercial electricity 300 is detected during the battery 106 is recharged. That is, in a case that the connector is disconnected during the battery is recharged, the recharging controller 200 discharges the DC link capacitor Cdc to the voltage lower than the reference voltage.

Figure 7:
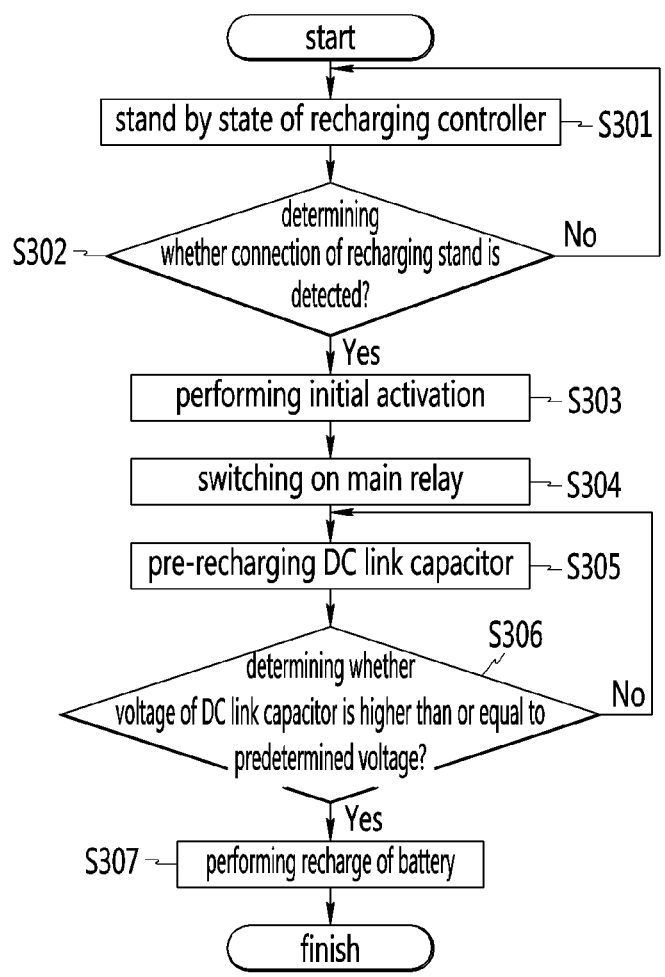
FIG. 7 is a flowchart of a method for pre-recharging a DC link by using a recharging system according to the second exemplary embodiment of the present invention.

FIG. 7 is a flowchart of a method for pre-recharging a DC link by using a recharging system according to the second exemplary embodiment of the present invention.

Referring to FIG. 7, in a state that the recharging controller 200 of the hybrid vehicle according to the second exemplary embodiment of the present invention stands by at step S301, the recharging controller 200 determines from the connection detector 109 whether the exterior commercial electricity 300 is connected at step S302.

The connection of the exterior commercial electricity 300 may be detected by the cover of the recharging port being open, a connection signal of the connector, or the communication with the recharging stand.

If the connection of the exterior commercial electricity 300 is detected at the step S302, the recharging controller 200 performs the initial activation thereof at step S303.

Generally, if the battery 106 begins to be recharged by the supply of the exterior commercial electricity 300, commercial electricity 300 of high voltage is supplied in a state that the voltage Vdc of DC link capacitor Cdc is maintained to be 0V. Therefore, a problem of inrush current may occur.

Such inrush current can result in fatal damage to electric switching elements constituting the first inverter 103, the second inverter 104, and the voltage converter 105.

Therefore, if the initial activation of the recharging controller 200 is performed, the recharging controller 200 switches on the main relay SR1 and SR2 and outputs the electricity of the battery 106 to the DC link at step S304.

At this time, the recharging controller 200 controls the first electric switching element S1 and the second electric switching element S2 in the voltage converter 105 and pre-recharges the DC link capacitor Cdc at step S305.

Subsequently, the recharging controller 200 determines whether the DC link capacitor Cdc is recharged to the voltage greater than or equal to the predetermined voltage at step S306. If the voltage of the DC link capacitor Cdc does not reach to the predetermined voltage at the step S306, the recharging controller 200 returns to the step S305 and pre-recharges the DC link capacitor Cdc.

On the contrary, if the DC link capacitor Cdc is recharged to the voltage greater than or equal to the predetermined voltage at the step S306, the recharging controller 200 performs the recharge of the battery 106 by using the exterior commercial electricity 300 according to the flowchart shown in FIG. 6 at step S307.

As described above, if the connection of the exterior commercial electricity is detected for recharging the battery, the recharging controller performs the initial activation thereof so as to stabilize the system and pre-recharges the DC link capacitor with the battery voltage so as to prevent occurrence of the inrush current according to the second exemplary embodiment of the present invention.

In addition, exterior commercial electricity is supplied to the first neutral point of the first motor and the second neutral point of the second motor so as to recharge the DC link capacitor, and the battery is stably recharged through a PWM control of the electric switching element of the voltage converter according to the second exemplary embodiment of the present invention. Since an expensive recharging device is not used, it is possible to reduce manufacturing costs and enhance fuel economy.

If the disconnection of the connector or the recharging stand is detected when the battery is recharged completely or during the battery is recharged, the DC link capacitor can be discharged to the voltage lower than the reference voltage. Therefore, the system may be stabilized and the battery may maintain the maximum recharge state.

Third Exemplary Embodiment

Hereinafter, a third exemplary embodiment of the present invention will be described in detail referring to the drawings.

Figure 8:
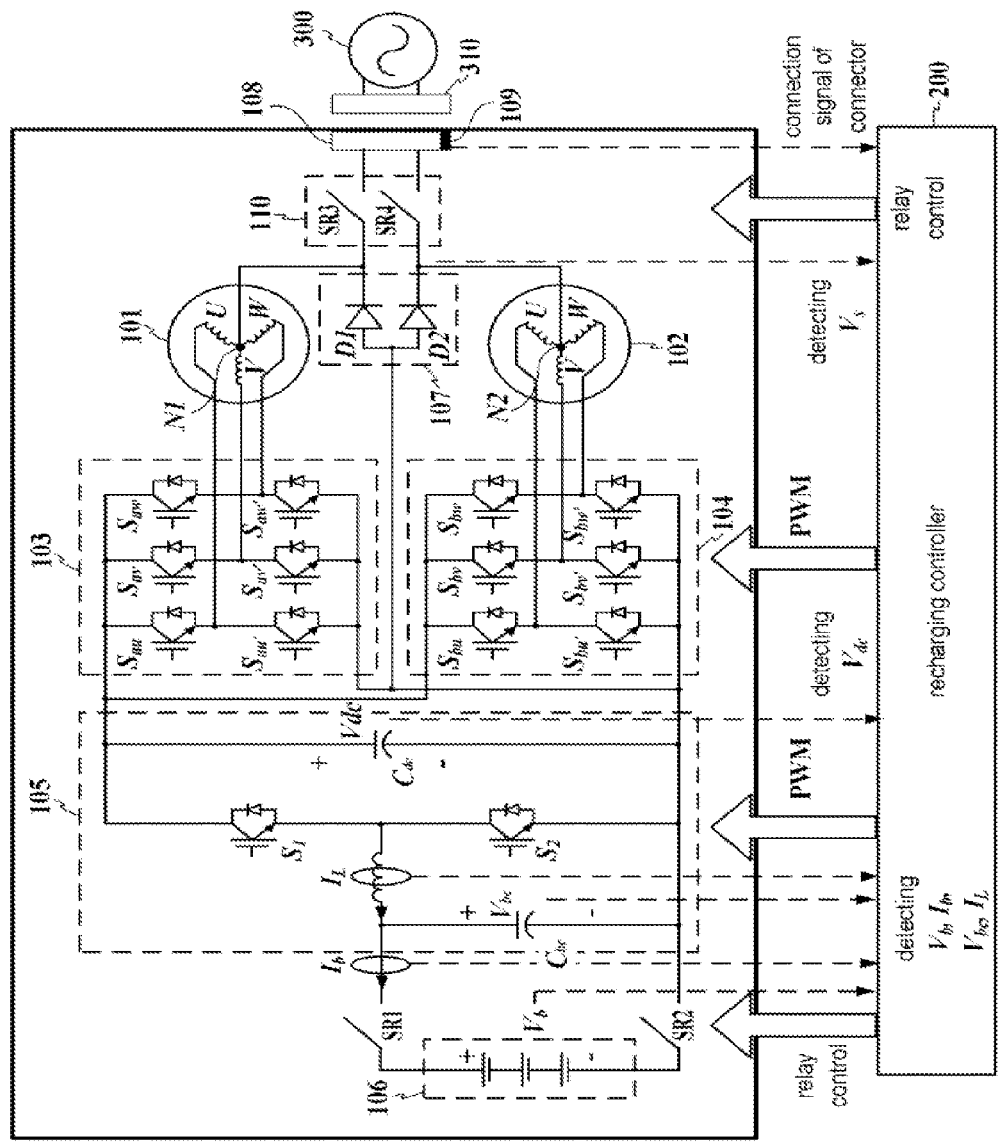
FIG. 8 is a circuit diagram of a recharging system of a hybrid vehicle according to a third exemplary embodiment of the present invention.

FIG. 8 is a circuit diagram of a recharging system of a hybrid vehicle according to the third exemplary embodiment of the present invention. Referring to FIG. 8, the third exemplary embodiment of the present invention preferably includes at least a first motor 101, a second motor 102, a first inverter 103, a second inverter 104, a voltage converter 105, a battery 106, a diode 107 (for example, including first and second diodes D1 and D2), a recharging port 108, a connection detector 109, a main relay SR1 and SR2, an input terminal switch 110, and a recharging controller 200.

The first motor 101 is a 3-phase AC electric motor, which can be operated as an electric motor to start an engine (not shown), and selectively operated as a generator driven by the engine.

The first motor 101 preferably is powered by 3-phase AC voltage supplied through the first inverter 103 so as to start the engine. In addition, the first motor 101 can be driven by the engine so as to generate 3-phase AC voltage and outputs the 3-phase AC voltage to the first inverter 103.

The second motor 102 preferably is a 3-phase AC electric motor for driving a driving wheel (not shown) and generating driving torque by 3-phase AC voltage supplied from the second inverter 104.

In addition, the second motor 102 can be operated as a generator in a case of regenerative braking of the vehicle so as to generate 3-phase AC voltage and outputs the 3-phase AC voltage to the second inverter 104.

The first motor 101 includes a Y-type wiring 3-phase coil as a stator coil. Also, U, V, and W phase coils forming the 3-phase coil each are respectively provided with one end interconnected so as to form a first neutral point N1 and the other end connected to a corresponding arm of the first inverter 103.

The first neutral point N1 of the first motor 101 is connected to commercial electricity 300 that preferably is input from the exterior.

The second motor 102 includes a Y-type wiring 3-phase coil as a stator coil. Also, U, V, and W phase coils forming the 3-phase coil each are respectively provided with one end interconnected so as to form a second neutral point N2 and the other end connected to a corresponding arm of the second inverter 104.

The second neutral point N2 of the second motor 102 is connected to the commercial electricity 300 input from the exterior.

The first inverter 103 converts the DC voltage of the battery 106 supplied through the voltage converter 105 into 3-phase AC voltage according to a PWM signal applied from the recharging controller 200 and supplies the 3-phase AC voltage to the first motor 101 as a driving voltage.

The first inverter 103 is connected to a DC link (a portion to which Vdc is applied) of the voltage converter 105 and the second diode D2 of the diode 107 so as to form a circulation path when the commercial electricity 300 supplied to the first inverter 103 through the first neutral point N1 of the first motor 101 has positive value (Vs>0).

The second inverter 104 converts the DC voltage of the battery 106 supplied through the voltage converter 105 into 3-phase AC voltage according to a PWM signal applied from the recharging controller 200 and supplies the 3-phase AC voltage to the second motor 102 as a driving voltage.

The second inverter 104 is connected to the DC link of the voltage converter 105 and the first diode D1 of the diode 107 so as to form a circulation path when the commercial electricity 300 supplied to the second inverter 104 through the second neutral point N2 of the second motor 102 has a negative value (Vs<0).

The first inverter 103 is formed by connecting electric switching elements in series, and includes U phase arms Sau and Sau', V phase arms Say and Say', and W phase arms Saw and Saw'.

One of an NPN transistor, an IGBT (Insulated Gate Bipolar Transistor), and an MOSFET may be used as the electric switching element.

The second inverter 104 is formed by connecting electric switching elements in series, and includes U phase arms Sbu and Sbu', V phase arms Sbv and Sbv', and W phase arms Sbw and Sbw'.

One of an NPN transistor, an IGBT (Insulated Gate Bipolar Transistor), and an MOSFET may be used as the electric switching element.

The voltage converter 105 is a DC/DC converter, raises or lowers the DC voltage supplied from the battery 106 to a voltage of predetermined level according to a PWM duty control signal applied from the recharging controller 200, and outputs it to the first inverter 103 or the second inverter 104.

In addition, the voltage converter 105 raises or lowers the DC voltage applied from the first inverter 103 or the second inverter 104 according to a PWM duty control signal applied from the recharging controller 200 and outputs it to the battery 106 as a recharging voltage.

The voltage converter 105 preferably is connected to both ends of the battery 106, and includes first and second electric switching elements S1 and S2 connected in series with a DC link capacitor Cdc and a smoothing capacitor Cbc smoothing a voltage change between both ends of the battery 106.

In a case that the exterior commercial electricity 300 supplied to the first neutral point N1 of the first motor 101 and the second neutral point N2 of the second motor 102 is supplied to the DC link forming the circulation path through the first inverter 103 and the second inverter 104, the voltage converter 105 switches on or off the first electric switching element S1 and the second electric switching element S2 according to a control signal applied from the recharging controller 200 and recharges the battery 106.

The battery 106 preferably utilizes DC electricity. For example, one of nickel-hydrogen and lithium-ion rechargeable battery and a capacitor of large capacity may be used as the battery 106. The DC voltage recharged in the voltage converter 105 is raised or lowered so as to be supplied to the first motor 101 or the second motor 102.

In addition, the battery 106 is recharged by the exterior commercial electricity 300 which is raised or lowered by the voltage converter 105 and is applied to the battery 106.

The diode 107 includes the first diode D1 and the second diode D2. One terminal, e.g., an anode terminal of the diode 107 is connected to a negative terminal of the first and second inverters 103 and 104, and a cathode terminal is connected to the exterior commercial electricity 300 and the first and second neutral points N1 and N2 of the first and second motors 101 and 102.

The recharging port 108 is connected to a recharging port 310 of the exterior commercial electricity 300, and receives electricity for recharging the battery 106.

The connection detector 109 detects a connection of a connector for connecting the commercial electricity 300 to the recharging port 108 and transmits information corresponding thereto to the recharging controller 200.

The connection detector 109 may be a cover open detector which detects that a cover of the recharging port is open.

In addition, the connection of the commercial electricity 300 to the recharging port 108 may be detected by communication between the recharging port 108 and a recharging stand for supplying the commercial electricity.

The communication between the recharging port 108 and the recharging stand can be done by various means, for example, wire communication and wireless communication including common interfaces such as CAN communication or Bluetooth communication.

The connection detector 109 transmits aim of recharging the battery 106 to the recharging controller 200 before the commercial electricity 300 is electrically connected to the first neutral point N1 of the first motor 101 and the second neutral point N2 of the second motor 102.

The main relay SR1 and SR2 is connected to both ends of the battery 106 and controls voltage and current input to or output from the battery 106.

The input terminal switch 110 controls supply of the exterior commercial electricity 300 to the first neutral point N1 of the first motor 101 and the second neutral point N2 of the second motor 102 through the recharging port 108.

The input terminal switch 110 includes a first relay SR3 connected to the first diode D1 and the first neutral point N1 of the first motor 101 and a second relay SR4 connected to the second diode D2 and the second neutral point N2 of the second motor 102.

The input terminal switch 110 switches on or off by the control of the recharging controller 200. Therefore, the input terminal switch 110 prevents the exterior commercial electricity 300 from being supplied in the system and stabilizes the system until the recharging controller 200 performs the initial activation and pre-recharges the DC link capacitor Cdc to be greater than or equal to the predetermined voltage by using the battery voltage when the connection of the exterior commercial electricity 300 is detected.

The commercial electricity 300 is selectively connected to the system through the recharging port 310. The commercial electricity 300 may be AC electricity or DC electricity.

In a case that the connection signal of the connector or open of the cover of the recharging port is detected, the recharging controller 200 recognizes this as the aim for recharging the battery 106 and performs the initial activation so as to stabilize the system before the exterior commercial electricity 300 is supplied.

If the initial activation of the recharging controller 200 is performed, the recharging controller 200 switches on the main relay SR1 and SR2 and pre-recharges the DC link capacitor Cdc to a voltage of predetermined level with the battery 106. Subsequently, the recharging controller 200 supplies the exterior commercial electricity 300 to the system. Therefore, it is possible to prevent occurrence of an inrush current when the commercial electricity 300 is supplied, thus protecting electric switching elements used in conjunction with the third exemplary embodiment of the present invention.

If the exterior commercial electricity 300 is not supplied to the first neutral point N1 of the first motor 101 and the second neutral point N2 of the second motor 102 after the recharge of the battery 106 is completed or the connector (for example, a recharging stand) is disconnected during recharging, the recharging controller 200 controls the first electric switching element S1 and the second electric switching element S2 in the voltage converter 105 so as to supply a remaining voltage remaining in the DC link capacitor Cdc to the battery 106 and to maintain the battery 106 to be a maximum recharge state. After the DC link capacitor Cdc is discharged to a voltage lower than a reference voltage, the recharging controller 200 switches off the main relay SR1 and SR2 so as to stabilizes the system.

In a state that the initial activation and the pre-recharge of the DC link capacitor are performed, the recharging controller 200 switches on the input terminal switch 110 so as for the exterior commercial electricity 300 to be supplied to the first neutral point N1 of the first motor 101 and the second neutral point N2 of the second motor 102.

In addition, the recharging controller 200 detects the phase Vs of the commercial electricity 300 supplied to the first neutral point N1 of the first motor 101 and the second neutral point N2 of the second motor 102, the voltage Vdc of the DC link capacitor Cdc forming a circulation loop, a battery voltage Vb, a voltage Vbc of the smoothing capacitor Cbc connected to both ends of the battery 106, an inductor current $I_L$, and a charging current Ib and determines a recharging mode.

In addition, the recharging controller 200 decides a recharging control value according to the recharging mode, and recharges the battery 106 by switching on or off the first electric switching element S1 and the second electric switching element S2 of the voltage converter 105 through the PWM duty control.

One of ordinary skill in the art would understand that driving the first motor by the battery voltage and starting the engine, recharging the battery by the voltage generated by the driving torque of the engine, driving the second motor by the battery voltage and running the vehicle, and recharging the battery through the regenerative braking as performed in conjunction with the third exemplary embodiment of the present invention are the same as those according to conventional arts, and detailed descriptions thereof will be omitted.

According to the third exemplary embodiment of the present invention, if recharging of the battery is detected, the recharging controller performs the initial activation and pre-recharges the DC link capacitor in a state that the input terminal switch is switched off and the commercial electricity is not supplied in the system. In addition, the third exemplary embodiment of the present invention relates to the recharge of the battery 106 by switching on the input terminal switch and supplying the exterior commercial electricity to the first neutral point N1 of the first motor 101 and the second neutral point N2 of the second motor 102 if the DC link capacitor is pre-recharged, and will be described in further detail.

Figure 9:
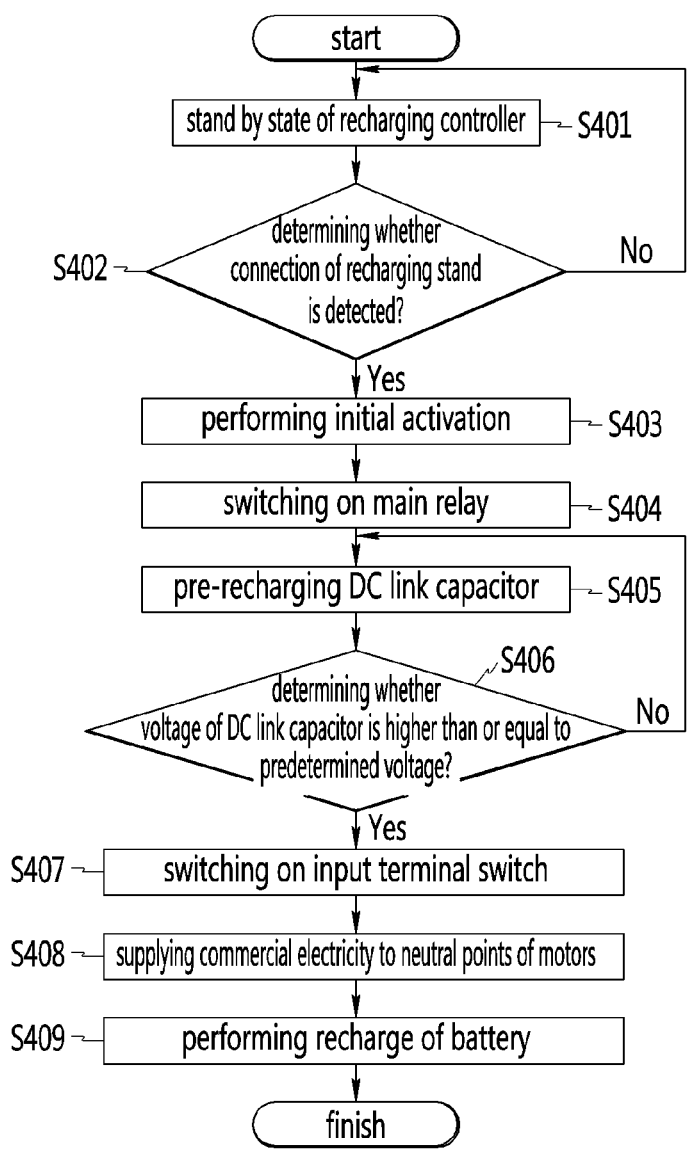
FIG. 9 is a flowchart of a method for pre-recharging a DC link by using the recharging system of FIG. 8.

FIG. 9 is a flowchart of a method for pre-recharging a DC link by using a recharging system according to the third exemplary embodiment of the present invention.

Referring to FIG. 9, in a state that the recharging controller 200 of the hybrid vehicle according to the third exemplary embodiment of the present invention stands by at step S401, the recharging controller 200 analyzes a signal of the connection detector 109 and determines whether the exterior commercial electricity 300 for recharging the battery 106 is connected to the recharging port 108 at step S402.

The connection of the exterior commercial electricity 300 may be detected by the cover of the recharging port being open, a connection signal of the connector, or communication with the recharging stand.

If the connection of the exterior commercial electricity 300 is detected at the step S402, the recharging controller 200 maintains the input terminal switch 110 in switching-off state and performs initial activation thereof at step S403.

In addition, the recharging controller 200 switches on the main relay SR1 and SR2 so as to supply the battery voltage to the voltage converter 105 at step S404, and operates the first electric switching element S1 and the second electric switching element S2 in the voltage converter 105 at step S405 such that the battery voltage is supplied to the DC link capacitor Cdc and the DC link capacitor Cdc is pre-recharged.

After that, the recharging controller 200 detects a recharging voltage of the DC link capacitor Cdc which is recharged, and determines the recharging voltage is higher than or equal to the predetermined voltage at step S406.

If the DC link capacitor Cdc is pre-recharged to the voltage higher than or equal to the predetermined voltage at the step S406, the recharging controller 200 switches on the input terminal switch 110 which was switching-off state at step S407 and supplies the exterior commercial electricity 300 connected to the recharging port 108 to the first neutral point N1 of the first motor 101 and the second neutral point N2 of the second motor 102 at step S408.

At this time, the electricity loop passing through the first neutral point N1 of the first motor 101, the second neutral point N2 of the second motor 102, the first inverter 103, the second inverter 104, the DC link capacitor Cdc, and the first diode D1 and the second diode D2 in the diode 107 is formed according to the phase Vs of the commercial electricity 300.

Therefore, the DC link capacitor Cdc in the voltage converter 105 is recharged, and the recharging controller 200 controls the first electric switching element S1 and the second electric switching element S2 in the voltage converter 105 so as to recharge the battery 106 at step S409.

The electricity loop formed according to the phase Vs of the commercial electricity 300 is the same as that of the first exemplary embodiment of the present invention, and thus, a detailed description thereof will be omitted.

Figure 10:
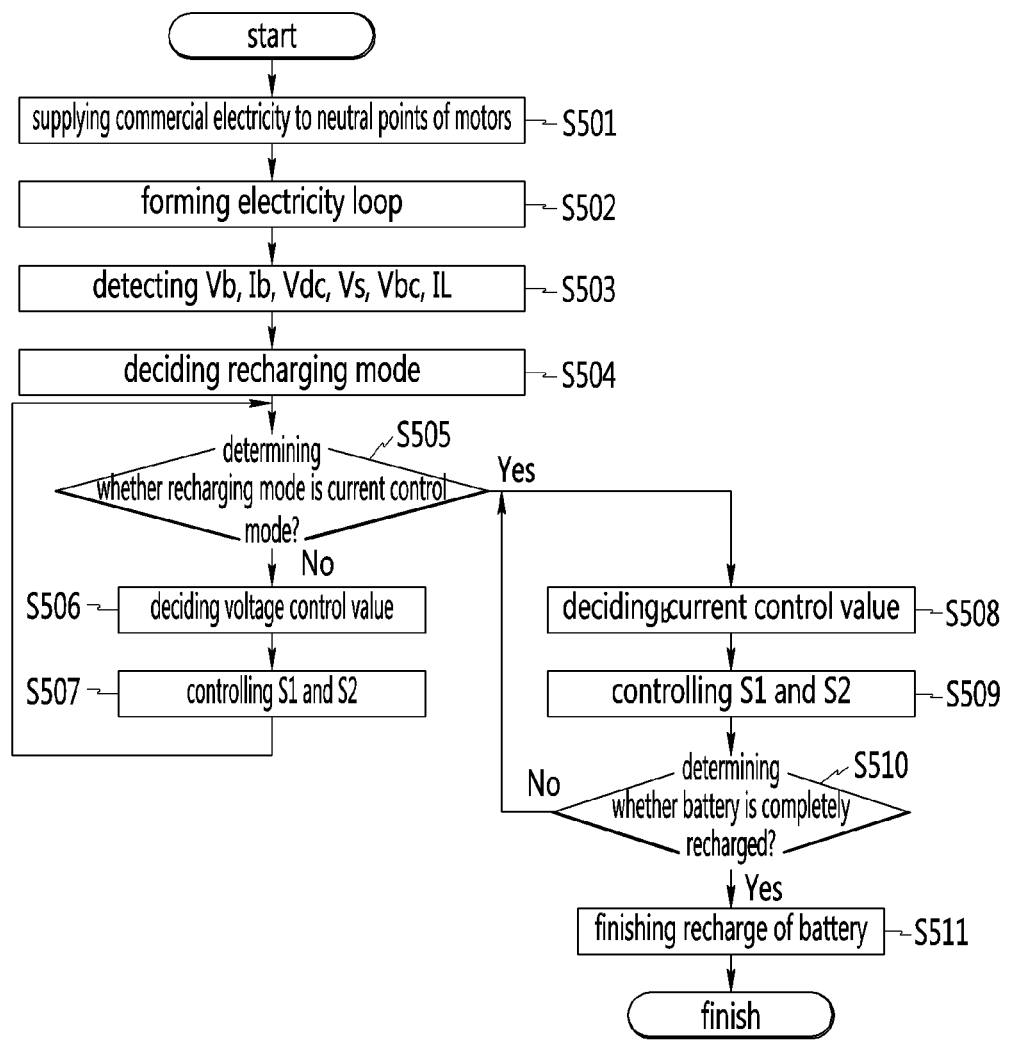
FIG. 10 is a flowchart of a method for recharging a battery by using a recharging system according to the third exemplary embodiment of the present invention.

FIG. 10 is a flowchart of a method for recharging a battery by using a recharging system according to the third exemplary embodiment of the present invention.

As described above, if the input terminal switch 110 is switched on and the exterior commercial electricity 300 is supplied to the first neutral point N1 of the first motor 101 and the second neutral point N2 of the second motor 102 at step S501, the electricity loop shown in FIG. 3 and FIG. 4 is formed according to the phase Vs of the commercial electricity 300 at step S502.

The recharging controller 200 detects the phase Vs of the commercial electricity supplied to the first neutral point N1 of the first motor 101 and the second neutral point N2 of the second motor 102, the voltage Vdc of the DC link capacitor Cdc which is recharged, the battery voltage Vb, the voltage Vbc of the smoothing capacitor Cbc connected to both ends of the battery 106, the inductor current $I_L$, and the charging current Ib at step S503, and determines the recharging mode based thereon at step S504.

Particularly, the recharging controller 200 determines whether the recharging mode is a current control mode where the battery voltage is maintained to be higher than or equal to a predetermined reference voltage (e.g., 80% of a maximum voltage) at step S505.

If the recharging mode is not the current control mode at the step S505, the recharging controller 200 decides that the recharging mode is the voltage control mode and decides a voltage control value which can maintain the voltage Vbc of the smoothing capacitor Cbc connected to both ends of the battery 106 to be constant at step S506.

Subsequently, the recharging controller 200 controls operations of the first electric switching element S1 and the second electric switching element S2 in the voltage converter 105 based on the voltage control value decided at the step S506 and performs a high-speed recharge of the battery 106 at step S507.

If the recharging mode is the current control mode at the step S505, the recharging controller 200 decides a current control value considering a detecting error at step S508.

Thereafter, the recharging controller 200 controls the operations of the first electric switching element S1 and the second electric switching element S2 in the voltage converter 105 based on the decided current control value, and controls a charging current of the battery 106 to follow the current control value at step S509.

The recharging controller 200 determines whether the battery 106 is completely recharged at step S510. If the battery 106 is not completely recharged at the step S510, the recharging controller 200 returns to the step S508 and repeats the steps S508 to S510. If the battery 106 is completely recharged at the step S510, the recharge of the battery 106 is finished at step S511 in order for the battery 106 to be overcharged.

Figure 11:
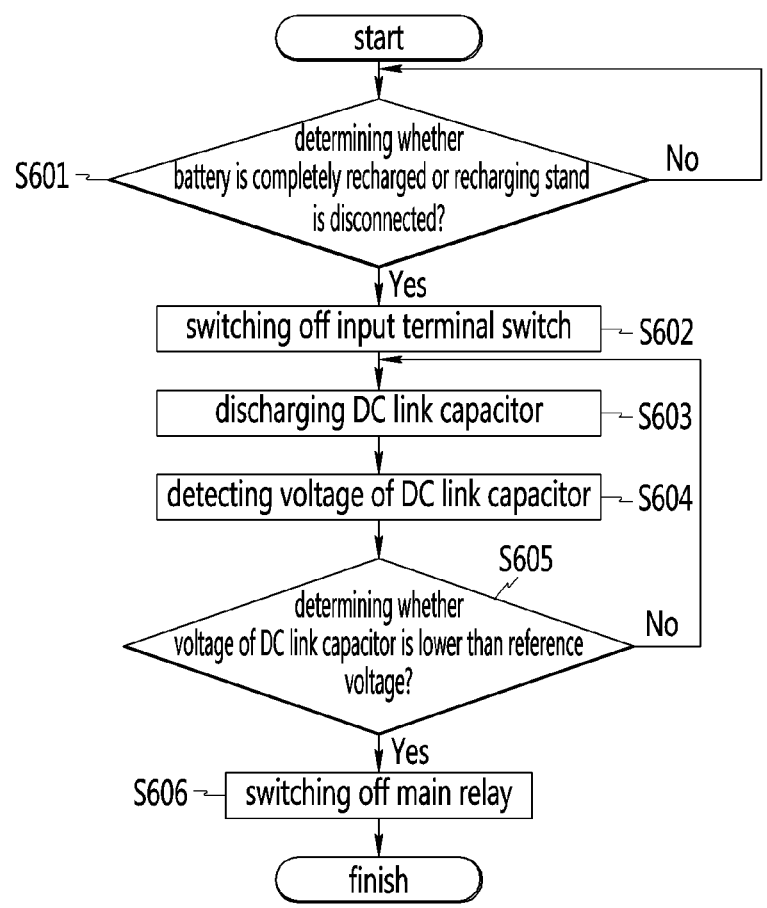
FIG. 11 is a flowchart of a method for completing a recharge of a battery by using a recharging system according to the third exemplary embodiment of the present invention.

FIG. 11 is a flowchart of a method for completing a recharge of a battery by using a recharging system according to the third exemplary embodiment of the present invention.

The recharging controller 200 determines whether the battery 106 is recharged completely or the recharging connector (recharging stand) is disconnected from the system at step S601.

If the battery 106 is recharged completely or the recharging connector (recharging stand) is disconnected from the system at the step S601, the recharging controller 200 switches off the input terminal switch 110 and disconnects the first neutral point N1 of the first motor 101 and the second neutral point N2 of the second motor 102 from the recharging port 108 at step S602.

Subsequently, the recharging controller 200 controls the first electric switching element S1 and the second electric switching element S2 in the voltage converter 105 so as to supply the remaining voltage remaining in the DC link capacitor Cdc to the battery 106 and to maintain the battery 106 to be a maximum recharge state. That is, the DC link capacitor Cdc is discharged to a voltage lower than the reference voltage at step S603.

The recharging controller 200 detects the voltage Vdc of the DC link capacitor Cdc at step S604 and determines whether the voltage Vdc of the DC link capacitor Cdc is lower than the reference voltage at step S605.

If the voltage Vdc of the DC link capacitor Cdc is higher than or equal to the reference voltage at the step the S605, the recharging controller 200 returns to the step S603 and discharges the DC link capacitor Cdc.

If the voltage Vdc of the DC link capacitor Cdc is lower than the reference voltage at the step S605, the recharging controller 200 switches off the main battery SR1 and SR2 mounted between both ends of the battery 106 and controlling input or output voltage of the battery 106 so as to stabilize the system at step S218. After that, the recharging controller completes the recharge of the battery 106 at step S606.

As described above, if the connection of exterior commercial electricity is detected for recharging the battery, the recharging controller performs the initial activation thereof so as to stabilize the system and pre-recharges the DC link capacitor with the battery voltage so as to prevent occurrence of the inrush current by controlling the input terminal switch according to the third exemplary embodiment of the present invention.

Fourth Exemplary Embodiment

Hereinafter, a fourth exemplary embodiment of the present invention will be described in detail referring to the drawings.

Figure 12:
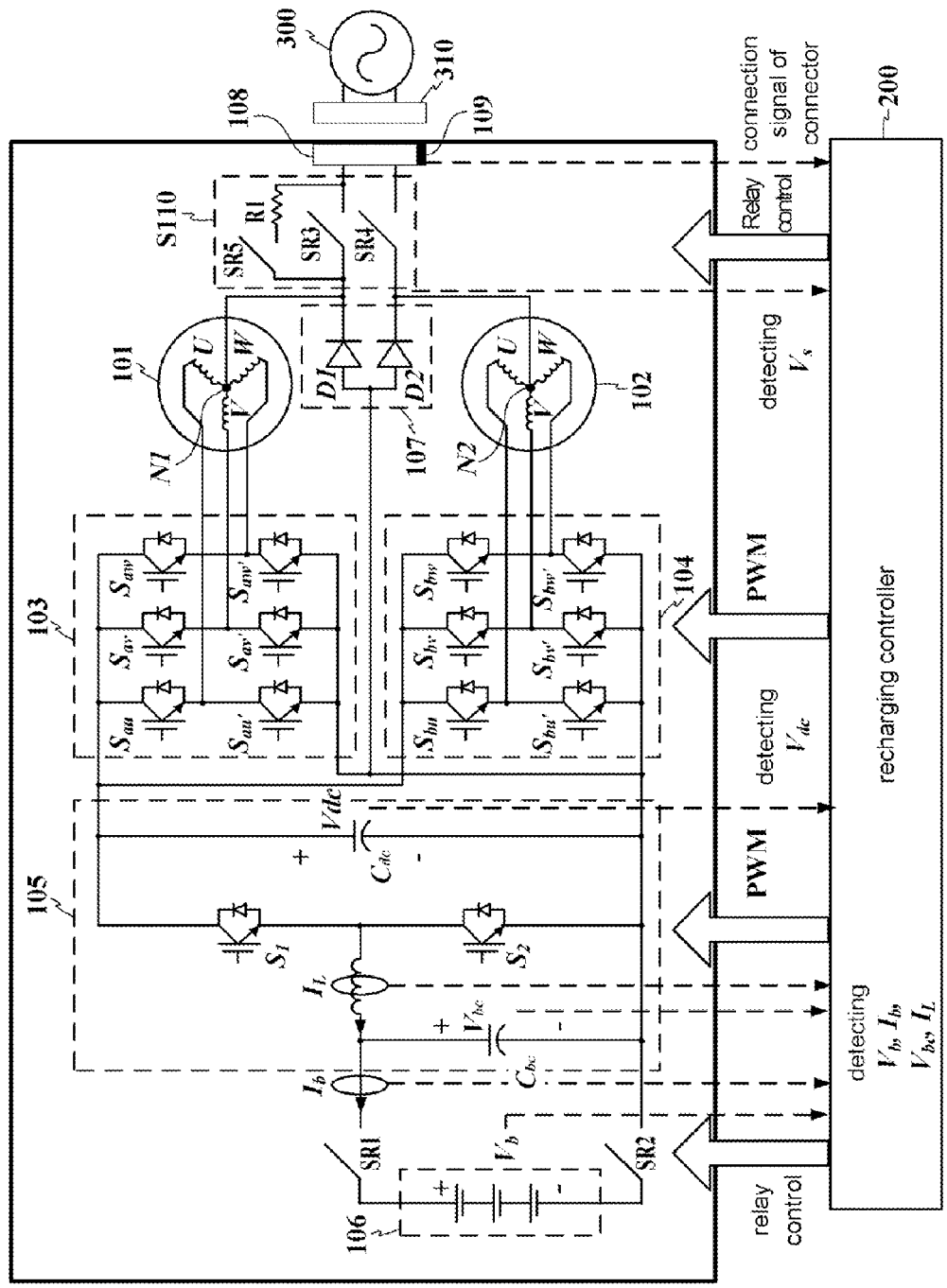
FIG. 12 is a circuit diagram of a recharging system of a hybrid vehicle according to a fourth exemplary embodiment of the present invention.

FIG. 12 is a circuit diagram of a recharging system of a hybrid vehicle according to the fourth exemplary embodiment of the present invention.

Referring to FIG. 12, the fourth exemplary embodiment of the present invention preferably includes at least a first motor 101, a second motor 102, a first inverter 103, a second inverter 104, a voltage converter 105, a battery 106, a diode 107 (for example, including first and second diodes D1 and D2), a recharging port 108, a connection detector 109, a main relay SR1 and SR2, an input terminal switch 110, and a recharging controller 200.

The first motor 101 is a 3-phase AC electric motor, which can be operated as an electric motor to start an engine (not shown), and is selectively operated as a generator driven by the engine.

The first motor 101 preferably is powered by 3-phase AC voltage supplied through the first inverter 103 so as to start the engine. In addition, the first motor 101 can be driven by the engine so as to generate 3-phase AC voltage and outputs the 3-phase AC voltage to the first inverter 103.

The second motor 102 preferably is a 3-phase AC electric motor for driving a driving wheel (not shown) and generating driving torque by 3-phase AC voltage supplied from the second inverter 104.

In addition, the second motor 102 can be operated as a generator in a case of regenerative braking of the vehicle so as to generate 3-phase AC voltage and outputs the 3-phase AC voltage to the second inverter 104.

The first motor 101 includes a Y-type wiring 3-phase coil as a stator coil. Also, U, V, and W phase coils forming the 3-phase coil each are respectively provided with one end interconnected so as to form a first neutral point N1 and the other end connected to a corresponding arm of the first inverter 103.

The first neutral point N1 of the first motor 101 is connected to commercial electricity 300 that preferably is input from the exterior.

The second motor 102 includes a Y-type wiring 3-phase coil as a stator coil. Also, U, V, and W phase coils forming the 3-phase coil each are respectively provided with one end interconnected so as to form a second neutral point N2 and the other end connected to a corresponding arm of the second inverter 104.

The second neutral point N2 of the second motor 102 is connected to commercial electricity 300 that preferably is input from the exterior.

The first inverter 103 converts the DC voltage of the battery 106 supplied through the voltage converter 105 into the 3-phase AC voltage according to a PWM signal applied from the recharging controller 200 and supplies the 3-phase AC voltage to the first motor 101 as a driving voltage.

The first inverter 103 is connected to a DC link (a portion to which Vdc is applied) of the voltage converter 105 and the second diode D2 of the diode 107 so as to form a circulation path when the commercial electricity 300 supplied to the first inverter 103 through the first neutral point N1 of the first motor 101 has a positive value (Vs>0).

The second inverter 104 converts the DC voltage of the battery 106 supplied through the voltage converter 105 into the 3-phase AC voltage according to a PWM signal applied from the recharging controller 200 and supplies the 3-phase AC voltage to the second motor 102 as a driving voltage.

The second inverter 104 is connected to the DC link of the voltage converter 105 and the first diode D1 of the diode 107 so as to form a circulation path when the commercial electricity 300 supplied to the second inverter 104 through the second neutral point N2 of the second motor 102 has a negative value (Vs<0).

The first inverter 103 is formed by connecting electric switching elements in series, and includes U phase arms Sau and Sau', V phase arms Sav and Sav', and W phase arms Saw and Saw'. One of an NPN transistor, an IGBT (Insulated Gate Bipolar Transistor), and an MOSFET may be used as the electric switching element.

The second inverter 104 is formed by connecting electric switching elements in series, and includes U phase arms Sbu and Sbu', V phase arms Sbv and Sbv', and W phase arms Sbw and Sbw'. One of an NPN transistor, an IGBT (Insulated Gate Bipolar Transistor), and an MOSFET may be used as the electric switching element.

The voltage converter 105 preferably is a DC/DC converter, and thus raises or lowers the DC voltage supplied from the battery 106 to a voltage of predetermined level according to a PWM duty control signal applied from the recharging controller 200, and outputs it to the first inverter 103 or the second inverter 104.

In addition, the voltage converter 105 raises or lowers the DC voltage applied from the first inverter 103 or the second inverter 104 according to a PWM duty control signal applied from the recharging controller 200 and outputs it to the battery 106 as a recharging voltage.

The voltage converter 105 preferably is connected to both ends of the battery 106, and includes first and second electric switching elements S1 and S2 connected in series with a DC link capacitor Cdc and a smoothing capacitor Cbc smoothing a voltage change between both ends of the battery 106.

In a case that the exterior commercial electricity 300 supplied to the first neutral point N1 of the first motor 101 and the second neutral point N2 of the second motor 102 is supplied to the DC link forming the circulation path through the first inverter 103 and the second inverter 104, the voltage converter 105 switches on or off the first electric switching element S1 and the second electric switching element S2 according to a control signal applied from the recharging controller 200 and recharges the battery 106.

The battery 106 preferably utilizes DC electricity. For example, one of nickel-hydrogen and lithium-ion rechargeable battery and a capacitor of large capacity may be used as the battery 106. The DC voltage recharged in the voltage converter 105 is raised or lowered so as to be supplied to the first motor 101 or the second motor 102.

In addition, the battery 106 is recharged by the exterior commercial electricity 300 which is raised or lowered by the voltage converter 105 and is applied to the battery 106.

The diode 107 includes the first diode D1 and the second diode D2. One terminal, e.g., an anode terminal of the diode 107 is connected to a negative terminal of the first and second inverters 103 and 104, and a cathode terminal is connected to the exterior commercial electricity 300 and the first and second neutral points N1 and N2 of the first and second motors 101 and 102.

The recharging port 108 is connected to a recharging port 310 of the exterior commercial electricity 300, and receives electricity for recharging the battery 106.

The connection detector 109 detects a connection of a connector for connecting the commercial electricity 300 to the recharging port 108 and transmits information corresponding thereto to the recharging controller 200.

The connection detector 109 may be a cover open detector which detects that a cover of the recharging port is open.

In addition, the connection of the commercial electricity 300 to the recharging port 108 may be detected by communication between the recharging port 108 and a recharging stand for supplying the commercial electricity.

The communication between the recharging port 108 and the recharging stand can be done by various means, for example, wire communication and wireless communication including common interfaces such as CAN communication or Bluetooth communication.

The connection detector 109 transmits aim of recharging the battery 106 to the recharging controller 200 before the commercial electricity 300 is electrically connected to the first neutral point N1 of the first motor 101 and the second neutral point N2 of the second motor 102.

The main relay SR1 and SR2 is connected to both ends of the battery 106 and controls voltage and current input to or output from the battery 106.

The input terminal switch 110 controls supply of the exterior commercial electricity 300 to the first neutral point N1 of the first motor 101 and the second neutral point N2 of the second motor 102 through the recharging port 108.

The input terminal switch 110 includes a first relay SR3 connected to the first diode D1 and the first neutral point N1 of the first motor 101, a second relay SR4 connected to the second diode D2 and the second neutral point N2 of the second motor 102, and a third relay SR5 connected in parallel with the first relay SR3 and connected in series with a resistance R1.

In addition, the input terminal switch 110 further includes a fourth relay (not shown) connected in parallel with the second relay SR4 and connected in series with a resistance (not shown).

The input terminal switch 110 switches on or off by the control of the recharging controller 200. Therefore, the input terminal switch 110 makes the exterior commercial electricity 300 to be a low voltage state by switching on the third relay SR5 connected in series with the resistance R1 and the second relay SR4 by the control of the recharging controller 200 in a state that the connection of the exterior commercial electricity 300 is detected. Subsequently, the input terminal switch 110 supplies the commercial electricity 300 of the low voltage state to the DC link capacitor Cdc and pre-recharges the DC link capacitor Cdc. If the DC link capacitor Cdc is pre-charged to the voltage higher than or equal to the predetermined voltage, the input terminal switch 110 switches off the third relay SR5 and switches on the first relay SR3 and the second relay SR4 so as to recharge the battery 106 by the supply of the normal commercial electricity 300.

The commercial electricity 300 is selectively connected to the system through the recharging port 310. The commercial electricity 300 may be AC electricity or DC electricity.

In a case that the connection signal of the connector or open of the cover of the recharging port is detected, the recharging controller 200 recognizes this as the aim for recharging the battery 106, switches off the input terminal switch 110, and performs the initial activation so as to stabilize the system.

If the initial activation of the recharging controller 200 is performed, the recharging controller 200 switches on the third relay SR5 connected in series with the resistance R1 and the second relay SR4 in the input terminal switch 110 so as to make the commercial electricity 300 to be the low voltage state, and supplies the commercial electricity 300 of the low voltage state to the DC link capacitor Cdc. Therefore, the DC link capacitor Cdc is pre-recharged. In addition, if the DC link capacitor Cdc is pre-recharged to the voltage higher than or equal to the predetermined voltage, the recharging controller 200 switches off the third relay SR5 and switches on the first relay SR3 and the second relay SR4 so as to recharge the battery by supplying the normal commercial electricity 300.

If the exterior commercial electricity 300 is not supplied to the first neutral point N1 of the first motor 101 and the second neutral point N2 of the second motor 102 after the recharge of the battery 106 is completed or the connector (recharging stand) is disconnected during recharging, the recharging controller 200 controls the first electric switching element S1 and the second electric switching element S2 in the voltage converter 105 so as to supply a remaining voltage remaining in the DC link capacitor Cdc to the battery 106 and to maintain the battery 106 to be a maximum recharge state. After the DC link capacitor Cdc is discharged to a voltage lower than a reference voltage, the recharging controller 200 switches off the main relay SR1 and SR2 so as to stabilizes the system.

One of ordinary skill in the art would understand that driving the first motor by the battery voltage and starting the engine, recharging the battery by the voltage generated by the driving torque of the engine, driving the second motor by the battery voltage and running the vehicle, and recharging the battery through the regenerative braking as performed in conjunction with the fourth exemplary embodiment of the present invention are the same as those according to conventional arts, and detailed descriptions thereof will be omitted.

The fourth exemplary embodiment of the present invention relates to a method for pre-recharging the DC link capacitor by supplying a low voltage when the commercial electricity is connected and for recharging the battery 106 by supplying normal commercial electricity to the first neutral point N1 of the first motor 101 and the second neutral point N2 of the second motor 102 when the DC link capacitor is pre-recharged, and will be described in further detail.

Figure 13:
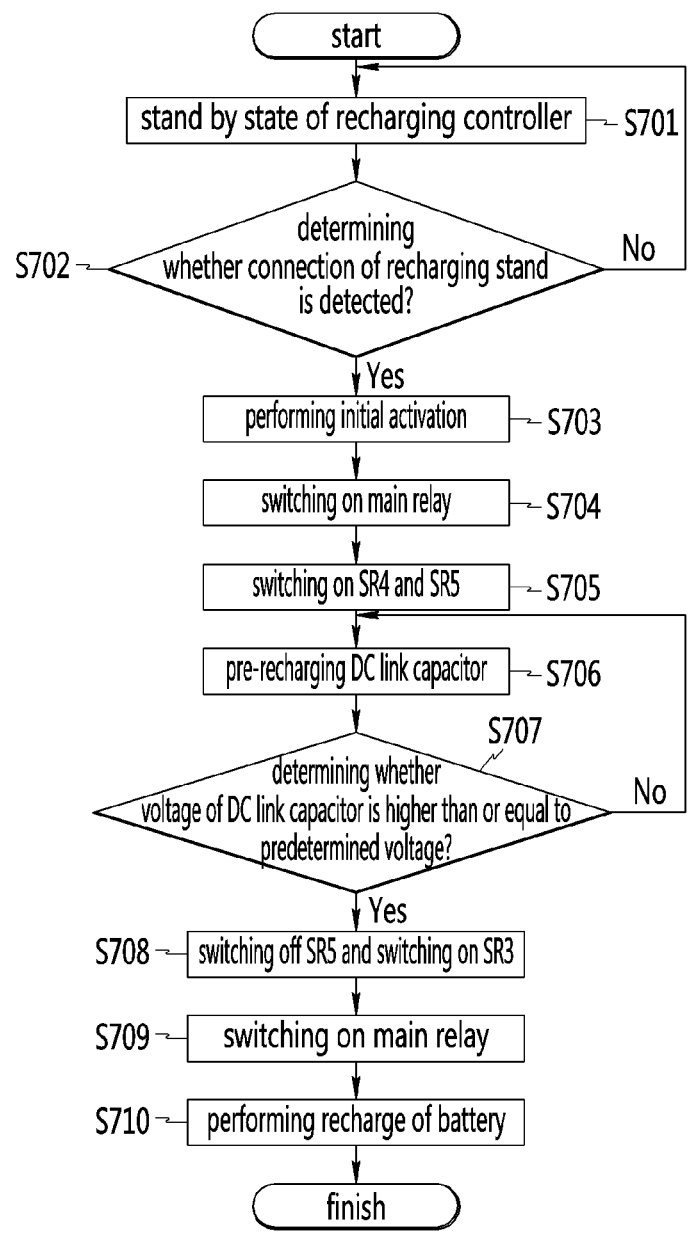
FIG. 13 is a flowchart of a method for pre-recharging a DC link by using the recharging system of FIG. 12.

FIG. 13 is a flowchart of a method for pre-recharging a DC link by using a recharging system according to the fourth exemplary embodiment of the present invention.

Referring to FIG. 13, in a state that the recharging controller 200 of the hybrid vehicle according to the fourth exemplary embodiment of the present invention stands by at step S701, the recharging controller 200 analyzes a signal of the connection detector 109 and determines whether the exterior commercial electricity 300 for recharging the battery 106 is connected to the recharging port 108 at step S702.

The connection of the exterior commercial electricity 300 may be detected by the cover of the recharging port being open, a connection signal of the connector, or the communication with the recharging stand.

If the connection of the exterior commercial electricity 300 is detected at the step S702, the recharging controller 200 maintains the input terminal switch 110 in switching-off state and performs the initial activation thereof at step S703.

Subsequently, the recharging controller 200 maintains the main relay SR1 and SR2 in switching-off state at step S704 and switches on the second relay SR4 and the third relay SR5 connected in series with the resistance R1 and connected in parallel with the first relay SR3 in the input terminal switch 110 so as to make the commercial electricity 300 to be the low voltage state through the resistance R1 at step S705. Thereafter, the recharging controller 200 supplies the commercial electricity 300 of the low voltage state to the DC link capacitor Cdc and pre-recharges the DC link capacitor Cdc at step S706.

The recharging controller 200 detects a recharging voltage of the DC link capacitor Cdc which is recharged, and determines the recharging voltage is higher than or equal to the predetermined voltage at step S707.

If the DC link capacitor Cdc is pre-recharged to the voltage higher than or equal to the predetermined voltage at the step S707, the recharging controller 200 switches off the third relay SR5 in the input terminal switch 110 and switches on the first relay SR3 and the second relay SR4. Therefore, the commercial electricity 300 connected to the recharging port 108 is supplied normally to the first neutral point N1 of the first motor 101 and the second neutral point N2 of the second motor 102 at step S708.

Therefore, the electricity loop passing through the first neutral point N1 of the first motor 101, the second neutral point N2 of the second motor 102, the first inverter 103, the second inverter 104, the DC link capacitor Cdc, and the first diode D1 and the second diode D2 in the diode 107 is formed according to the phase Vs of the commercial electricity 300.

The DC link capacitor Cdc in the voltage converter 105 is recharged, and the recharging controller 200 switches on the main relay SR1 and SR2 and controls the first electric switching element S1 and the second electric switching element S2 in the voltage converter 105 so as to recharge the battery 106 at step S710.

The electricity loop formed according to the phase Vs of the commercial electricity 300 is the same as that of the first exemplary embodiment of the present invention, and thus, a detailed description thereof will be omitted.

Figure 14:
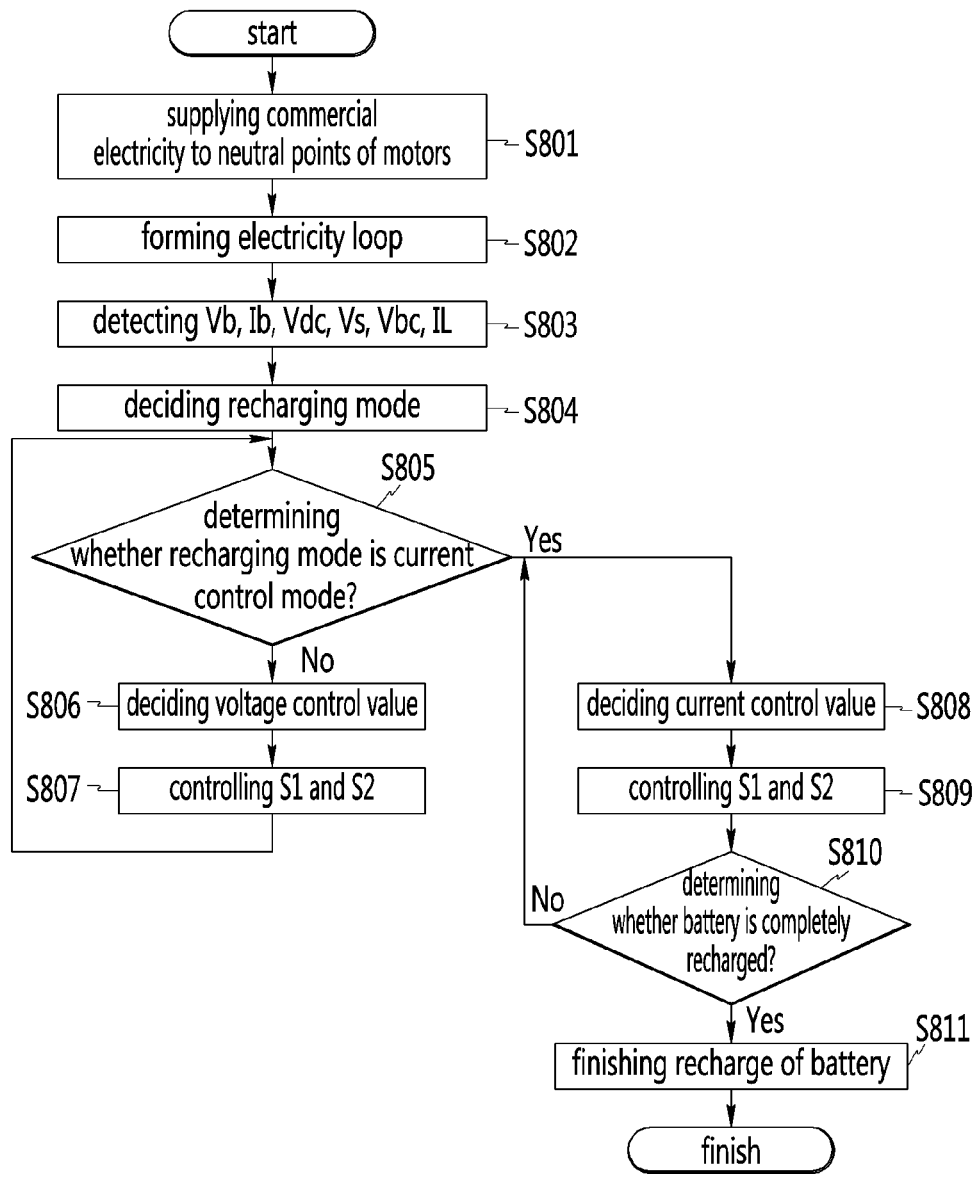
FIG. 14 is a flowchart of a method for recharging a battery by using a recharging system according to the fourth exemplary embodiment of the present invention.

FIG. 14 is a flowchart of a method for recharging a battery by using a recharging system according to the fourth exemplary embodiment of the present invention.

As described above, if the input terminal switch 110 is switched on and the exterior commercial electricity 300 is supplied to the first neutral point N1 of the first motor 101 and the second neutral point N2 of the second motor 102 at step S801, the electricity loop shown in FIG. 3 and FIG. 4 is formed according to the phase Vs of the commercial electricity 300 at step S802.

The recharging controller 200 detects the phase Vs of the commercial electricity supplied to the first neutral point N1 of the first motor 101 and the second neutral point N2 of the second motor 102, the voltage Vdc of the DC link capacitor Cdc which is recharged, the battery voltage Vb, the voltage Vbc of the smoothing capacitor Cbc connected to both ends of the battery 106, the inductor current $I_L$, and the charging current Ib at step S803, and determines the recharging mode based thereon at step S804.

Particularly, the recharging controller 200 determines whether the recharging mode is a current control mode where the battery voltage is maintained to be higher than or equal to a predetermined reference voltage (e.g., 80% of a maximum voltage) at step S805.

If the recharging mode is not the current control mode at the step S805, the recharging controller 200 decides that the recharging mode is the voltage control mode and decides a voltage control value which can maintain the voltage Vbc of the smoothing capacitor Cbc connected to both ends of the battery 106 to be constant at step S806.

Subsequently, the recharging controller 200 controls operations of the first electric switching element S1 and the second electric switching element S2 in the voltage converter 105 based on the voltage control value decided at the step S806 and performs a high-speed recharge of the battery 106 at step S807.

If the recharging mode is the current control mode at the step S805, the recharging controller 200 decides a current control value considering a detecting error at step S808.

Thereafter, the recharging controller 200 controls the operations of the first electric switching element S1 and the second electric switching element S2 in the voltage converter 105 based on the decided current control value, and controls a charging current of the battery 106 to follow the current control value at step S809.

The recharging controller 200 determines whether the battery 106 is completely recharged at step S810. If the battery 106 is not completely recharged at the step S810, the recharging controller 200 returns to the step S808 and repeats the steps S808 to S810. If the battery 106 is completely recharged at the step S810, the recharge of the battery 106 is finished at step S811 in order for the battery 106 to be overcharged.

Figure 15:
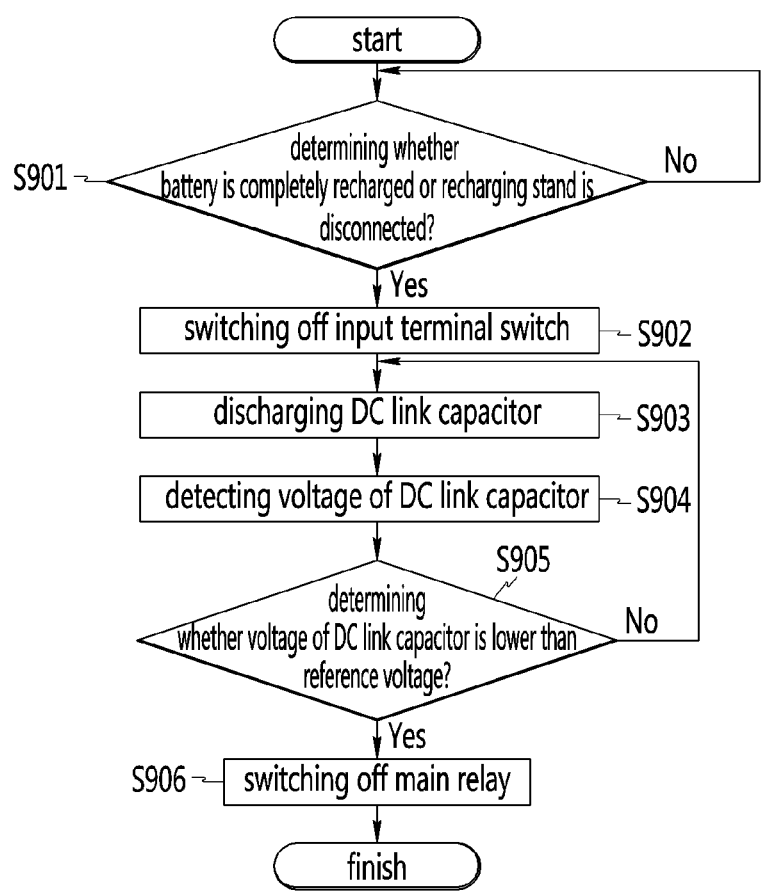
FIG. 15 is a flowchart of a method for completing a recharge of a battery by using a recharging system according to the fourth exemplary embodiment of the present invention.

FIG. 15 is a flowchart of a method for completing a recharge of a battery by using a recharging system according to the fourth exemplary embodiment of the present invention.

The recharging controller 200 determines whether the battery 106 is recharged completely or the recharging connector (recharging stand) is disconnected from the system at step S901.

If the battery 106 is recharged completely or the recharging connector (recharging stand) is disconnected from the system at the step S901, the recharging controller 200 switches off the input terminal switch 110 and disconnects the first neutral point N1 of the first motor 101 and the second neutral point N2 of the second motor 102 from the recharging port 108 at step S902.

Subsequently, the recharging controller 200 controls the first electric switching element S1 and the second electric switching element S2 in the voltage converter 105 so as to supply the remaining voltage remaining in the DC link capacitor Cdc to the battery 106 and to maintain the battery 106 to be a maximum recharge state. That is, the DC link capacitor Cdc is discharged to a voltage lower than the reference voltage at step S903.

The recharging controller 200 detects the voltage Vdc of the DC link capacitor Cdc at step S904 and determines whether the voltage Vdc of the DC link capacitor Cdc is lower than the reference voltage at step S905.

If the voltage Vdc of the DC link capacitor Cdc is higher than or equal to the reference voltage at the step the S905, the recharging controller 200 returns to the step S903 and discharges the DC link capacitor Cdc.

If the voltage Vdc of the DC link capacitor Cdc is lower than the reference voltage at the step S905, the recharging controller 200 switches off the main battery SR1 and SR2 mounted between both ends of the battery 106 and controlling input or output voltage of the battery 106 so as to stabilize the system at step S218. Thereafter, the recharging controller completes the recharge of the battery 106 at step S906.

As described above, if the connection of the exterior commercial electricity is detected for recharging the battery, the recharging controller performs the initial activation thereof so as to stabilize the system and pre-recharges the DC link capacitor with the battery voltage so as to prevent occurrence of the inrush current by controlling the input terminal switch according to the fourth exemplary embodiment of the present invention.

According to the present invention, since the battery is recharged by a motor and an inverter provided in a hybrid vehicle, an expensive charger cannot be used and price competitiveness may be enhanced.

Since weight of the hybrid vehicle is reduced, fuel economy may be enhanced. In addition, space availability may be enhanced.

Since the present invention provides high-speed recharging function by using the motor of large capacity and the inverter provided in the hybrid vehicle, additional components and exterior chargers for high-speed recharge may not be needed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A recharging system of a hybrid vehicle, comprising:
a battery in which DC voltage is stored or for outputting the DC voltage;
first and second motors configured to function as an electric motor or a generator;
first and second inverters for operating the first and second motors respectively;
a voltage converter for raising or lowering the DC voltage of the battery such that the raised or lowered DC voltage is supplied to the first and second inverters, in order to raise or lower the DC voltage supplied from the first and second inverters such that the raised or lowered DC voltage is supplied to the battery, and provided with a DC link;
first and second diodes each provided with an anode terminal connected to a negative terminal of the first and second inverters, and a cathode terminal connected to a source of commercial electricity and also connected to first and second neutral points of the first and second motors;
a recharging controller for carrying out a recharging mode by detecting at least one of a phase of the commercial electricity supplied to the first and second neutral points of the first and second motors, a voltage of a DC link capacitor connecting the voltage converter and the first and second inverters, a battery voltage, a voltage of a smoothing capacitor connected at both terminals of the battery, a battery current, and a current flowing from the voltage converter to the battery, and controlling the voltage converter through a PWM duty according to the recharging mode of the battery such that the voltage of the DC link capacitor is raised or lowered, and is supplied to the battery;
a main relay selectively connecting the battery with the voltage converter;

a recharging port selectively connecting the commercial electricity disposed at an exterior of the vehicle to the first and second diodes;

a connection detector for detecting a connection of the commercial electricity;

and an input terminal switch mounted between the recharging port and the first and second motors and selectively connecting the commercial electricity to the first and second neutral points of the first and second motors by control of the recharging controller, wherein the input terminal switch comprises a first relay connected to the first diode and the first neutral point of the first motor; and a second relay connected to the second diode and the second neutral point of the second motor.

2. The recharging system of claim 1, wherein the recharging controller performs an initial activation thereof, switches on the main relay, and switches off the input terminal switch so as to pre-recharge the DC link by means of the battery voltage in a case that the connection detector detects the connection of the commercial electricity.

3. The recharging system of claim 2, wherein the recharging controller switches on the input terminal switch and controls a recharge of the battery according to the recharging mode in a case that the pre-recharge of the DC link is completed.

4. The recharging system of claim 3, wherein the recharging controller decides the current control value and controls the charging current of the battery to follow the current control value in a case that the recharging mode of the battery is the current control mode.

5. The recharging system of claim 3, wherein the recharging controller decides a voltage control value required for maintaining the voltage of the smoothing capacitor to be constant and controls the voltage converter based on the voltage control value so as to recharge the battery in a case that the recharging mode of the battery is not the current control mode.

* * * * *